(12) United States Patent
Martinez Lerin

(10) Patent No.: US 12,500,890 B2
(45) Date of Patent: Dec. 16, 2025

(54) APPLICATION ACCESS CONTROL CONFIGURATION

(71) Applicant: HITACHI, LTD., Tokyo (JP)

(72) Inventor: Pablo Martinez Lerin, Yokohama (JP)

(73) Assignee: HITACHI VANTARA, LTD., Yokohama (JP)

( * ) Notice: Subject to any disclaimer, the term of this patent is extended or adjusted under 35 U.S.C. 154(b) by 719 days.

(21) Appl. No.: 17/831,552

(22) Filed: Jun. 3, 2022

(65) Prior Publication Data

US 2023/0396622 A1   Dec. 7, 2023

(51) Int. Cl.
  *H04L 29/06*   (2006.01)
  *H04L 9/40*   (2022.01)

(52) U.S. Cl.
  CPC .......... *H04L 63/101* (2013.01); *H04L 63/102* (2013.01); *H04L 63/20* (2013.01)

(58) Field of Classification Search
  CPC ...... H04L 63/101; H04L 63/102; H04L 63/20
  See application file for complete search history.

(56) References Cited

U.S. PATENT DOCUMENTS

| | | | | |
|---|---|---|---|---|
| 5,933,498 A * | 8/1999 | Schneck | ................ | G06F 21/72 705/54 |
| 6,654,032 B1 * | 11/2003 | Zhu | ........................ | H04L 67/01 709/204 |
| 7,784,031 B1 * | 8/2010 | Borg | ................... | G06F 9/44505 717/121 |
| 8,122,484 B2 | 2/2012 | Karjoth et al. | | |
| 8,402,269 B2 | 3/2013 | Bae et al. | | |
| 8,543,606 B2 | 9/2013 | Pulfer et al. | | |
| 8,965,925 B2 | 2/2015 | Zoellner | | |
| 9,137,265 B2 | 9/2015 | Chari et al. | | |
| 9,455,990 B2 | 9/2016 | Beedubail et al. | | |
| 9,773,102 B2 | 9/2017 | Graham et al. | | |
| 9,936,020 B2 | 4/2018 | Leggette et al. | | |
| 2004/0193953 A1 * | 9/2004 | Callahan | ............. | G06F 11/1451 714/E11.123 |
| 2013/0055378 A1 * | 2/2013 | Chang | ..................... | G06F 21/53 726/17 |
| 2014/0208088 A1 * | 7/2014 | Somani | ..................... | G06F 8/65 713/1 |
| 2015/0200948 A1 * | 7/2015 | Cairns | ..................... | G06F 21/44 726/4 |
| 2019/0129407 A1 | 5/2019 | Cella et al. | | |

* cited by examiner

*Primary Examiner* — Harunur Rashid
(74) *Attorney, Agent, or Firm* — MATTINGLY & MALUR, PC

(57) ABSTRACT

In some examples, one or more processors are able to communicate with a plurality of user devices associated with a plurality of users, and the one or more processors may provide a plurality of applications executable in association with the plurality of users. For each application of the plurality of applications, the one or more processors may determine data access permissions for the application. Additionally, the one or more processors may determine data access permissions for individual users of a plurality of users. Based on the data access permissions for the plurality of users and the data access permissions for the plurality of applications, the one or more processors may generate a data structure including data access permissions for each of the applications. The generated data access permissions for each of the applications may be customized for, or otherwise specific to, individual users of the plurality of users.

14 Claims, 17 Drawing Sheets

| User ID | Display Name | Read Permissions | Write Permissions |
|---|---|---|---|
| UID-HR | HR | /shares/HR<br>/shares/HR_global | /shares/HR<br>/shares/HR_global |
| UID-SN | Sales North department | /shares/sales/north<br>/shares/sales_history | /shares/sales/north |
| UID-SS | Sales South department | /shares/sales/south<br>/shares/sales_history | /shares/sales/south |

FIG. 4

| Application | Use Case | Input Requirements | Output Requirements | Additional Read Requirements | Additional Write Requirements |
|---|---|---|---|---|---|
| ETL | Data Filtering | Required | Required | -- | -- |
| ETL | Data Sorting | Required | Required | /temporal | /temporal |
| Visualizer | Visualization | Required | No | /shares/images | /shares/publish |
| Repository | Template Generation | No | Required | /shares/repo | -- |

FIG. 5

| Application | Use Case | Input Requirements | Output Requirements | Additional Read Requirements | Additional Write Requirements | Data Copy Allowed |
|---|---|---|---|---|---|---|
| ETL | Data Filtering | Required | Required | -- | -- | No |
| ETL | Data Sorting | Required | Required | /temporal | /temporal | No |
| Visualizer | Visualization | Required | No | /shares/images | /shares/publish | Yes |
| Repository | Template Generation | No | Required | /shares/repo | -- | No |

FIG. 6

| Application | Use Case | Allowed Users |
|---|---|---|
| ETL | Data Filtering | UID-SN |
| ETL | Data Sorting | UID-SN, UID-SS |
| Visualizer | Visualization | UID-SN, UID-SS, UID-HR |
| Repository | Template Generation | UID-HR |

FIG. 7

| Permission ID ⁓802 | User ID ⁓804 | Application ⁓806 | Use Case ⁓808 | Read Permissions ⁓810 | Write Permissions ⁓812 |
|---|---|---|---|---|---|
| PID-1 | UID-SN | ETL | Data Filtering | /shares/sales/north<br>/shares/sales_history | /shares/sales/north |
| PID-2 | UID-SN | ETL | Data Sorting | /shares/sales/north<br>/shares/sales_history<br>/temporal | /shares/sales/north<br>/temporal |
| PID-3 | UID-SN | Visualizer | Visualization | /shares/sales/north<br>/shares/sales_history<br>/shares/images | /shares/publish |
| PID-4 | UID-SS | ETL | Data Sorting | /shares/sales/south<br>/shares/sales_history<br>/temporal | /shares/sales/south<br>/temporal |
| PID-5 | UID-SS | Visualizer | Visualization | /shares/sales/south<br>/shares/sales_history<br>/shares/images | /shares/publish |
| PID-6 | UID-HR | Visualizer | Visualization | /shares/images<br>/shares/HR | /shares/publish |
| PID-7 | UID-HR | Repository | Template Generation | /shares/repo | /shares/HR<br>/shares/HR_global |

FIG. 8

| Source | Destination |
|---|---|
| /shares/HR_global | /remote_shares/HR_global |
| /shares/publish | /remote_shares/publish |
| /shares/backups | /remote_shares/backups |

FIG. 9

| Permission ID | User ID | Application | Use Case | Read Permissions | Write Permissions |
|---|---|---|---|---|---|
| PID-1 | UID-SN | ETL | Data Filtering | /shares/sales/north /shares/sales_history | /shares/sales/north |
| PID-2 | UID-SN | ETL | Data Sorting | /shares/sales/north /shares/sales_history /temporal | /shares/sales/north /temporal |
| PID-3 | UID-SN | Visualizer | Visualization | /shares/sales/north /shares/sales_history /shares/images | /shares/publish |
| PID-4 | UID-SS | ETL | Data Sorting | /shares/sales/south /shares/sales_history /temporal | /shares/sales/south /temporal |
| PID-5 | UID-SS | Visualizer | Visualization | /shares/sales/south /shares/sales_history /shares/images | /shares/publish |
| PID-6 | UID-HR | Visualizer | Visualization | /shares/images /shares/HR | /shares/publish |
| PID-7 | UID-HR | Repository | Template Generation | /shares/repo | /shares/HR |

FIG. 10

APPLICATION ACCESS CONTROL CONFIGURATION

BACKGROUND

In recent years, information technology has transitioned from users interacting with privately owned servers and data centers to the widespread use of commercially available computing and storage resources provided at multiple computing sites such as edge sites and public cloud sites. These commercial computing services are provided by third-party entities and typically include computing resources that are shared with other customers of the third-party entities. Consequently, these arrangements have made it desirable for entities that use these commercial computing services to pursue more secure mechanisms for controlling data access.

One popular concept for improving security is the principle of "least privilege" in which a particular user is provided only the minimum level of data permissions necessary for performing the tasks which that particular user is expected to perform. In these multi-site computing environments, administrators often are tasked with configuring such individual data access permissions for a large number of users. Administrators are also often tasked with configuring data access permissions for the applications used by these large numbers of users at each site. However, when performed manually by an administrator, these tasks may be time-consuming and prone to human-error.

SUMMARY

In some implementations, one or more processors are able to communicate with a plurality of user devices associated with a plurality of users, and the one or more processors may provide a plurality of applications executable in association with the plurality of users. For each application of the plurality of applications, the one or more processors may determine data access permissions for the application. Additionally, the one or more processors may determine data access permissions for individual users of a plurality of users. Based on the data access permissions for the plurality of users and the data access permissions for the plurality of applications, the one or more processors may generate a data structure including data access permissions for each of the applications. The generated data access permissions for each of the applications may be customized for, or otherwise specific to, individual users of the plurality of users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example of a user permission data structure according to some implementations.

FIG. 5 illustrates an example of an application access requirements data structure according to some implementations.

FIG. 6 illustrates another example of an application access requirements data structure according to some implementations.

FIG. 7 illustrates an example of an allowed users data structure according to some implementations.

FIG. 8 illustrates an example of an application permissions data structure according to some implementations.

FIG. 9 illustrates an example of the data copy data structure according to some implementations.

FIG. 10 illustrates another example of the application permissions data structure according to some implementations.

DESCRIPTION

Figure 1:
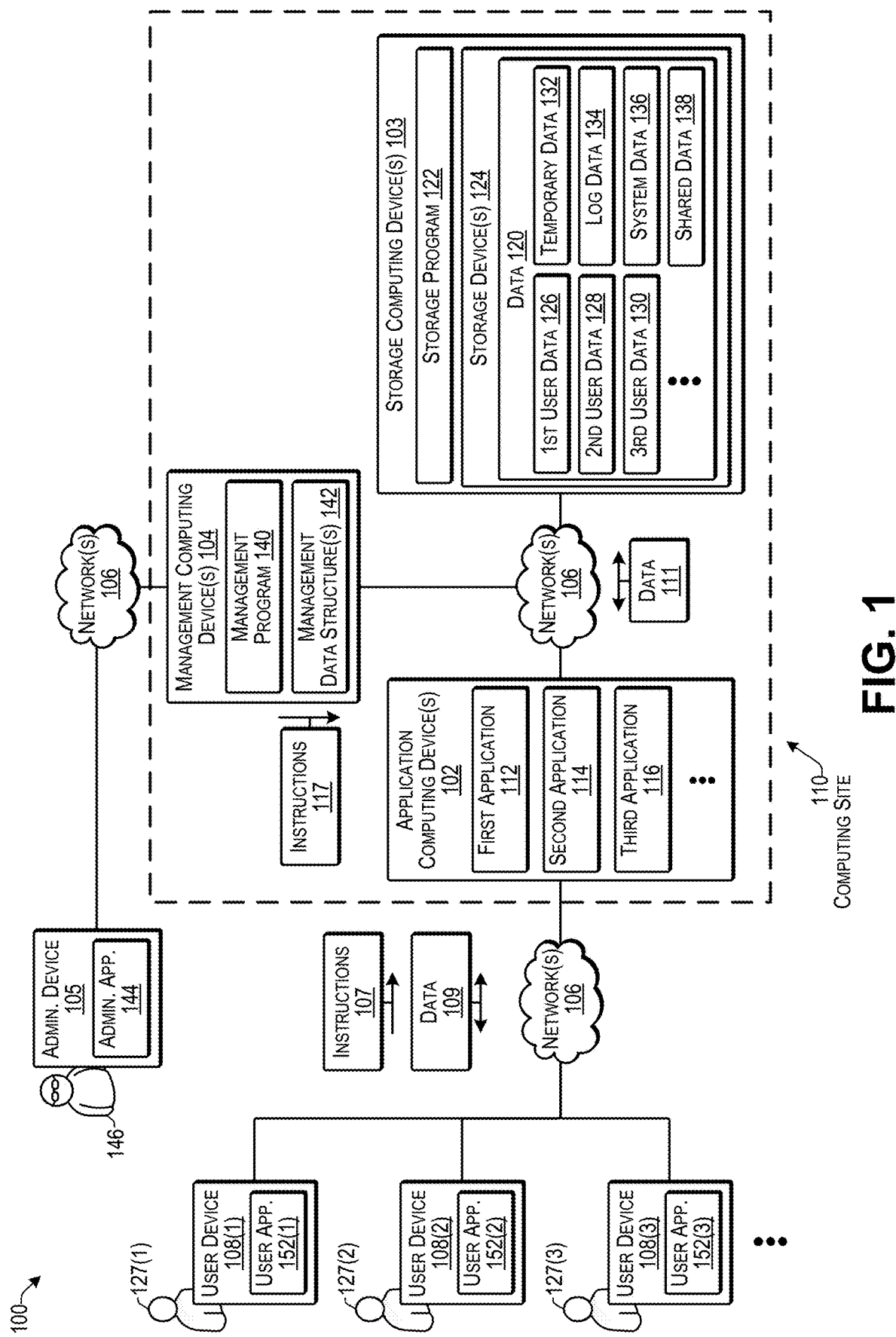
FIG. 1 illustrates an example architecture of a system able to automatically configure application access permissions according to some implementations.

Some implementations herein are directed to techniques and arrangements for managing data access control in multi-site computing environments, such as commercial computing environments or other edge or cloud computing environments in which there may be a large number of users and applications that store and/or access data in the computing environment. For instance, some examples include automatically configuring data access permissions for applications so that the application permissions are customized or otherwise specific to individual users that use or are otherwise associated with the particular applications being configured. For example, if an application executes using the same data access permissions for all users of an entity, a first user might be able to intentionally or unintentionally configure a particular application to access data that belongs to a different user, and to which data the first user should not have access.

Furthermore, merely assigning to applications the same permissions as those of the user account of the user running the application typically does not provide a desired outcome. For instance, applications may need to access additional data that users themselves do not need to access, such as temporary folders, logging folders, and system folders. Further, applications may run on a schedule, run at a different times, may run unsupervised, and so forth, and so it may not be possible for the application to run based on a user account of a person who may not be logged in at the time at which the application executes.

Implementations herein solve the problems discussed above by automatically generating and storing data access permissions for applications that are specifically adapted for each application and for each user. Some examples include one or more data structures that may include (1) the data access requirements for each application, including the whether the particular application receives input data and/or generates output data; and (2) the data access permissions assigned to each user within the particular computing system and/or at least the portion of the system applicable to the particular application. Based on the information included in the one or more data structures, individual data access permissions can be automatically generated and stored for managing the data access of the respective applications. For instance, applications that are executed using the generated permissions, can be limited by the generated permissions to access only the folders and/or other data to which the corresponding user that is associated with a particular instance of the application has access, as well as to specified temporary folders, logging folders, and/or system folders to which the specified instance of the application is to have access.

Examples herein automatically configure data access permissions for applications for each user that is able to configure the application for execution. Accordingly, implementations herein provide the ability to enforce highly secure data access controls that avoid unauthorized data access via applications in a multi-site environment with a large number of users. Additionally, some implementations leverage knowledge of folders configured for remote copy to a different site, for example for the purpose of backup and disaster recovery. For example, knowledge of the data access requirements associated with each application may also include whether copying the output data generated by the respective application to a remote location is acceptable. If not acceptable, then examples herein may prevent the application from storing output data to folders configured for remote copy. These features can help avoid violating data location and governance policies set by a company or a government, and may further avoid unnecessarily expending computing and network resources to copy data that does not need to be copied, such as in the case that the data may be deleted soon or is not important.

For discussion purposes, some implementations are described in the environment of one or more computing sites in communication with a plurality of client devices. However, implementations herein are not limited to the particular examples provided, and may be extended to other types of computing system architectures, other types of storage environments, other types of client configurations, other types of data and data structures, and so forth, as will be apparent to those of skill in the art in light of the disclosure herein.

FIG. 1 illustrates an example architecture of a system 100 able to automatically configure application access permissions according to some implementations. The system 100 includes one or more application computing devices 102 that are able to communicate with one or more storage computing devices 103 and one or more management computing devices 104 through one or more networks 106. Further, at least the one or more application computing devices 102 are able to communicate over the one or more networks 106 with one or more user computing devices 108, such as user devices 108(1), 108(2), 108(3), . . . , which may be any of various types of computing devices, as discussed additionally below. At least the management computing device(s) 104 may be able to communicate with an administrator computing device 105 over the network(s) 106.

The one or more networks 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, a direct wired connection, or any combination of the foregoing. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail.

In some cases, the network(s) 106 may include a frontend network for transmitting communications, such as instructions 107 and/or data 109, between the user device(s) 108 and one or more of the application computing device(s) 102, the storage computing device(s) 103, and the management computing device(s) 104. Further, in some examples, the network(s) 106 may include a backend network for transmitting communications between the application computing device(s) 102 and the storage computing device(s) 103, such as for sending data 111 for storage or retrieving data 111 from storage via the storage computing device(s) 103. In addition, the network(s) 106 may include a management network for enabling communication between the management computing device(s) 104 and the application computing device(s) 102 and the storage computing device(s) 103. Regardless of the network configuration, the application computing device(s) 102, the storage computing device(s) 103, the user device(s) 108, and the management computing device(s) 104 are able to communicate over the one or more networks 106 using wired and wireless connections, and combinations thereof.

The application computing device(s) 102, the storage computing device(s) 103, and the management computing device(s) 104 may each include one or more servers or any other suitable computing devices, as discussed additionally below, e.g., with respect to FIGS. 3, 16, and 17. In the illustrated example, the application computing device(s) 102, the storage computing device(s) 103, and the management computing device(s) 104 are associated with a computing site 110. For instance, the application computing device(s) 102, the storage computing device(s) 103, and/or the management computing device(s) 104 may be located at the same data center, same computer cluster, same computer group, same geographic location, or the like. Alternatively, the application computing device(s) 102, the storage computing device(s) 103, and/or the management computing device(s) 104 may be located at different data centers, different computer clusters, different computer groups, different geographic locations (e.g., different cities, different states, different countries), and so forth. Accordingly, implementations herein are not necessarily limited to co-location of the various computing devices at the same data center, same computer cluster, same computer group, same geographic location, etc. Additionally, as another alternative, the application computing device(s) 102, the storage computing device(s) 103 and/or the management computing device(s) 104 may be included in the same physical computing device(s) in some cases, may be run on virtual machines in some cases, or the like. For instance, one or more physical computing devices may be configured as a pool of virtual machines and a pool of containers that may be used to implement the application computing device(s) 102, the storage computing device(s) 103, and/or the management computing device(s) 104. Numerous other variations will be apparent to those of skill in the art having the benefit of the disclosure herein.

The application computing device(s) 102 may include any number of applications, such as one or more instances of a first application 112, one or more instances of a second application 114, one or more instances of a third application 116, and so forth, that may be executed on the application computing device(s) 102, such as based on instructions 117 received from the management computing device(s) 104 or instructions 107 received from the user device(s) 108. The application 112, 114, 116, ..., may be essentially any type of application able to be executed on the computing devices herein. Non-limiting examples of applications may include translation applications, video editing applications, spreadsheet applications, accounting applications, business applications, and any of numerous other types of applications as will be apparent to those of skill in the art having the benefit of the disclosure herein.

In some examples, instances of the applications 112, 114, 116 may execute based on a schedule, may execute based on a trigger condition being met, and/or may be invoked by instructions 117 received from the management computing device 104. Additionally, in some examples, instances of the applications 112, 114, 116 may execute when invoked by instructions 107 received from a user device 108 in real time, or the like. During execution, instances of the applications 112, 114, 116 may interact with the storage computing device(s) 103, such as for accessing data 120 used by the respective application 112, 114, 116 and/or for storing data 120 used by or generated by the respective instance of the application 112, 114, 116.

The storage computing device(s) 103 may each include a storage program 122 that may be executed on the storage computing device(s) 103 to store data 120, respectively, on one or more storage devices 124 associated with the storage computing device(s) 103. In some cases, the storage device(s) 124 may include arrays of storage devices, while in other examples, the storage device(s) 124 may be storage devices that are included in, or otherwise associated with, individual servers of the storage computing device(s) 103, respectively. Furthermore, the storage devices 124 accessed by the storage computing device(s) 103 may be of a plurality of different types, configurations, etc., as discussed additionally below. Numerous other possible configurations and variations of the storage device(s) 124 will be apparent to those of skill in the art having the benefit of the disclosure herein.

The storage program 122 may enable the storage computing device(s) 103 to respond to data write requests from the application computing device(s) 102 and/or the user devices 108, such as for storing application data and/or user data as a portion of the data 120. The storage program 122 may also provide the applications 112, 114, 116 and/or the user devices 108 with requested data, such as in response to data read requests. In the illustrated example, the data 120 includes first user data 126 associated with a first user 127(1), second user data 128 associated with a second user 127(2), third user data 130 associated with a third user 127(3), and so forth. In addition, the data 120 may include temporary data 132 and/or log data 134 that may be accessed by and/or generated by one or more of the applications 112, 114, 116.

Further, the data 120 may include system data 136. As one example, the system data may be created by the storage computing device(s) 103, such as by the storage program 122 creating metadata and other system data that is related to the application data and the user data, and which may also be included in the data 120. For instance, the system data 136 may include storage configurations, container names, storage locations, storage paths, data storage life, data protection level, and the like, for each stored data object or other stored data included in the data 120. The storage program 122 may configure the storage computing device(s) to perform various other functions, such as for providing archiving, storage protection levels, storage class hierarchies, disaster recovery, garbage collection, and so forth.

In addition, the data 120 may include shared data 138. For example, the first user 127(1) and the second user 127(2) may share a shared folder, and may share data within the shared folder. Further, the data access permissions of the users able to access the shared folder may differ from one user to the next. For example, suppose that the first user 127(1) has permission to read, write, and delete data in the shared folder, while the second user 127(2) has permission to only read the data in the shared folder. In view of this, as discussed additionally below, the data access permissions created for applications 112, 114, 116 associated with the first user 127(1) might also differ from the data access permissions created for applications associated with the second user 127(2) despite being for the same application 112, 114, 116. Further while several examples are discussed above, numerous other variations will be apparent to those of skill in the art having the benefit of the disclosure herein.

The management computing device(s) 104 may execute a management program 140 that employs one or more management data structures 142 for setting specific application permissions for specific users 127 within the system 100. For example, an administrator application 144 may be executed on the administrator device 105 by an administrator user 146 to invoke execution of and/or to interact with the management program 140. In some examples, the administrator user 146 may use the administrator application 144 to manually assign data access permissions to the users 127, such as based on information received from the management program 140 and/or from the users 127 or other sources.

The management program 140 may employ one or more management data structures 142 for determining and assigning data access permissions for applications in association with specific users and based on information about the specific users 127. For instance, the management computing device 104 may store data access permissions for the users 127 such as in a user permission data structure. In addition, the management computing device 104 may store data access permissions for applications 112, 114, 116, ..., in an applications permissions data structure, as discussed additionally below.

The administrator users 146 may interact with the management computing device 104, such as via communication with the management program 140, to define the data access permissions for users and/or applications. Additionally, in some examples, the users 127 may interact with the management computing device 104, such as via communication with the management program 140, to configure a job for execution in the application computing device 102. For example, the users 127 may schedule an instance of one of the applications 112, 114, 116 to execute at a desired time and date, at periodic recurrences, based on a trigger condition being met, or the like.

Furthermore, the management program 140 executed on the management computing device 104 may communicate with the storage program 122 executing on the storage computing device(s) 103 to respond to requests to validate data access requests from the user devices 108 and/or from the application computing device(s) 102. For example, based on the data access permissions stored in the management data structures 142, the storage program 122 executing on the storage computing device(s) 103 may determine whether to allow access to particular requested data requested through particular data access request from the user devices 108 or from the application computing device(s) 102. Additionally, while the management data structures 142 are illustrated as being stored on the management computing device 104 in this example, in other examples, the management data structures 142 may be stored additionally, or alternatively, on the storage computing device(s) 103, and may be updated by the management program 140 as updates occur.

In some examples, the management program 140 may include a web app or the like. In additional examples, the management program 140 may include any other suitable type of program, user interface, or the like that provides the users 127, 146 with the ability to cause the management computing device 104 to perform the functions described herein. Additionally, while the management program 140 and the management data structures 142 are illustrated as being installed on the management computing device 104 in this example, in other examples, the management program 140 and/or the management data structures 142 may be installed on one or more of the application computing device(s) 102 and/or the storage computing device(s) 103 instead of, or in addition to, being installed on the management computing device(s) 104. Furthermore, the administrator user 146 may be responsible for other configuration and management operations for the application computing device(s) 102 and the storage computing device(s) 103 in the system 100 for ensuring proper operation, as is known in the art.

Each user device 108 may be any suitable type of computing device such as a desktop, laptop, tablet computing device, mobile device, smart phone, wearable device, and/or any other type of computing device able to send data over a network. Users 127 may be associated with user devices 108, respectively, such as through a respective user account, user login credentials, or the like. Additionally, the user devices 108 may be able to communicate with the application computing device(s) 102 and the storage computing device(s) 103 through the one or more networks 106 or through any other suitable type of communication connection.

Further, each user device 108(1), 108(2), 108(3), ..., may include at least one respective user application 152(1), 152(2), 152(3), ..., that may execute on the respective user device 108, such as for communicating with the application computing device(s) 102 and the storage computing device(s) 103, such as for storing user data with the storage computing device(s) 103 and/or for sending instructions 107 to the application computing device(s) 102. As one example, the user application 152 may include a browser or may operate through a browser, and the storage program 122 may include a web application (not shown in FIG. 1) for enabling the user 127 to access data 120 through one of the storage systems 102. Alternatively, in other cases, the user application 152 may include any other type of application having communication functionality enabling communication with the application computing device(s) 102 and/or the storage computing device(s) 103 over the one or more networks 106.

In the system 100, there may be hundreds or thousands of users 127. The users 127 may be individuals or groups of individuals. As one example, the first user 127(1) may be a group of individuals employed by an entity, such as a human resources team, a sales team, an engineering department, or the like, who all have the same data access permissions within the system 100, or at least within a portion of the system 100. The users 127 may store data to, and may receive data from, the storage computing device(s) 103 that their respective user devices 108 are in communication with. For instance, the storage computing device(s) 103 may provide storage services for the users 127 and their respective user devices 108. Examples of data access requests may include read, write, delete, overwrite, read metadata, and write metadata. In some cases, the user data may be represented by a data path to a file in a file system associated with the user. The users 127 may typically interact with storage computing device(s) 103 located at a site that is geographically close to a location of the respective user 127, but in other examples the users may interact with storage computing device(s) 103 at more remote locations, such as in other states, other countries, etc. Numerous variations will be apparent to those of skill in the art having the benefit of the disclosure herein.

During steady state operation there may be multiple users 108 periodically communicating with respective ones of the storage computing device(s) 103 for storing and retrieving data and/or communicating with the application computing device(s) 102 and/or the management computing device 104 such as for executing instances of the applications 112, 114, 116. Further, the storage computing device(s) 103 may communicate with the user devices 108 and/or the application computing device(s) 102 to respond to data access requests. Prior to responding to a data access request, the storage computing device(s) 103 may communicate with the management computing device to validate data access requests from the user computing device 108 and/or from the application computing device 102. When a data access request is not permitted based on the data access permissions stored in the management data structures 142, the storage computing device(s) 103 may send a reply that rejects the particular data access request. On the other hand, when the data access request is permitted, the storage computing device(s) 103 may fulfill the request.

As another example, the storage computing device(s) 103 may employ a cache technique of storing the data access permission information for users and applications in a cache memory to avoid having to communicate with the management computing device 104 for each data access request. Furthermore, in some cases, the storage computing device(s) 103 may communicate with an identity provider (not shown in FIG. 1) to validate the identity of the users 127 and/or the administrator users 146. Additionally, in some cases, the applications 112, 114, 116 may be configured as trusted applications for the storage computing device(s) 103 to avoid having to validate the identity of the applications 112, 114, 116 that sends data access requests to the storage computing device(s) 103.

As one example of executing the applications 112, 114, 116, an instance of an application, such as application 112, may be invoked to execute one or more jobs configured by one of the users 127. As one example of a job, suppose that the application 112 is invoked every Saturday to calculate the sales results for an entity from the prior week. The management computing device 104 may assign a permission ID to each job, as discussed additionally below, e.g., with respect to the application permissions data structure of FIGS. 8 and 9. When the application 112 executes the job, the application 112 accesses data stored in the storage computing device(s) 103 by sending a data access request to the storage computing device(s) 103. For instance, the data access request may include information such as the data access operation, identification of the target data, and the permission ID assigned to the job that is being executed. As mentioned above, examples of data access operations may include read, write, delete, overwrite, read metadata, and/or write metadata. As one example, the target data may be identified based on a data path to a file in a filesystem that is recognized by the storage computing device(s) 103. In response to receiving the data access request, the storage program 122 may check the access permissions of the application 112 associated with the permission ID assigned to the job, to determine whether the application 112 is permitted to access all of the identified target data included in the access request. If so, the storage computing devices 103 may perform the requested access request operation(s). If not, the storage computing devices 103 may return a communication to the requesting instance of the first application 112 indicating that access to the requested data is denied.

Some examples herein include automatically generating and configuring data access permissions for a particular instance of an application and for a particular user that has caused the particular instance of the application to be invoked. For example, the management computing device 104 may generate or otherwise maintain a data structure that includes a profile for each application of the plurality of applications 112, 114, 116, . . . . The profile for each application 112, 114, 116, . . . , may include application-specific information for the respective application, such as required access to shared data, data access limitations, and required system permissions to run. Furthermore, the management computing device may generate or otherwise maintain a data structure that includes the data access permissions for each user of the plurality of users 127. Based on the application profile data structure and the user data access permissions data structure, the management computing device 104 may generate an applications data access permissions data structure by combining the respective user permissions for each user with the respective application profile for each application 112, 114, 116, . . . , to determine the application permissions for an instance of the respective application 112, 114, 116, . . . , when invoked a particular user 127. As mentioned above, the management program 140 may provide the application data access permissions to the storage computing device(s) 103 to enable the storage computing device(s) 103 to determine how to respond to a data access request from a particular instance of an application. Accordingly, implementations herein enable a large number of users 127 to configure and run applications 112, 114, 116, . . . , in a multiuser environment while avoiding unauthorized data access.

Figure 2:
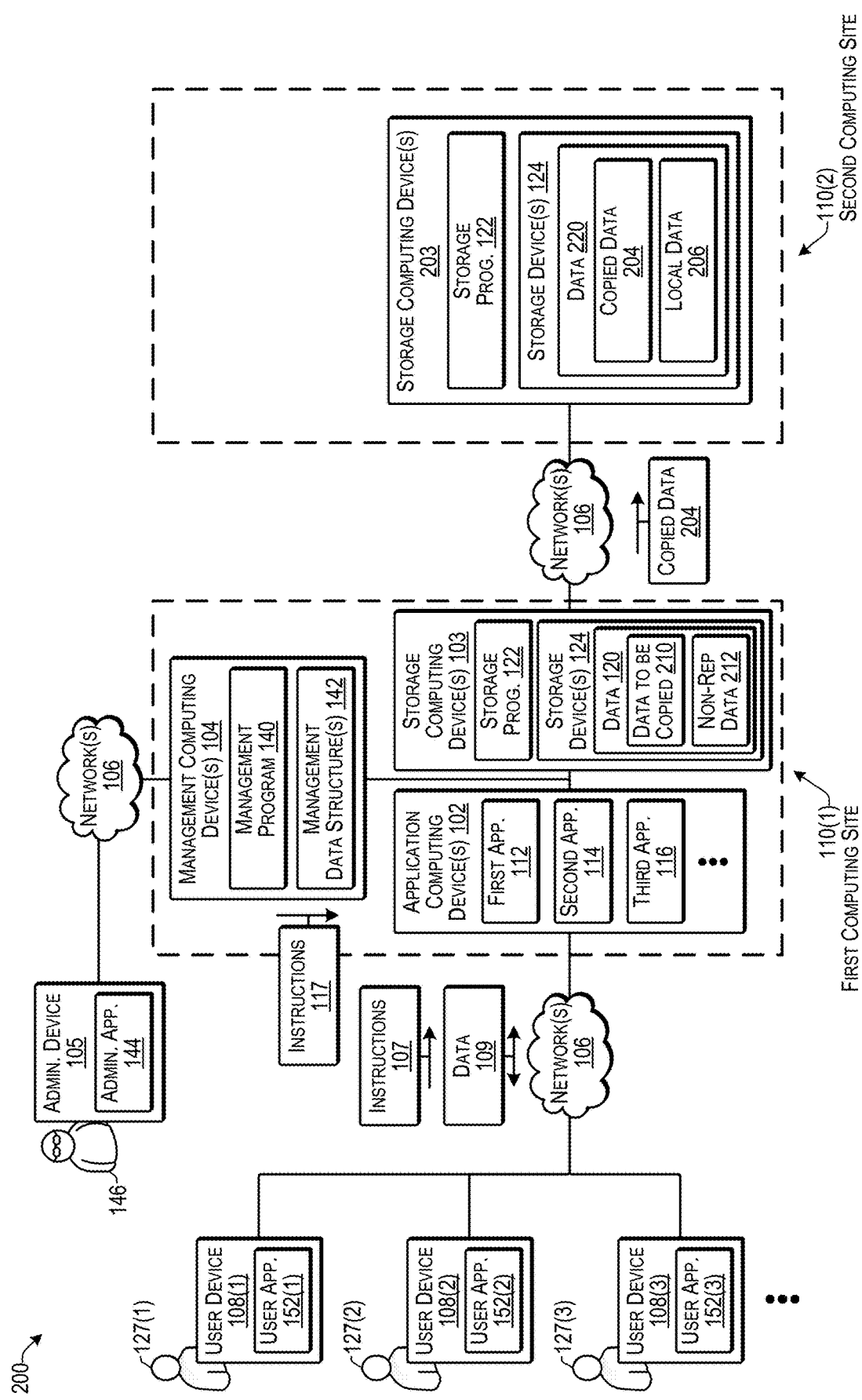
FIG. 2 illustrates an example architecture of a system able to automatically generate application permissions according to some implementations.

FIG. 2 illustrates an example architecture of a system 200 able to automatically generate application permissions according to some implementations. Some components of the system 200 may correspond to the system 100 discussed above with respect to FIG. 1. Accordingly, corresponding components are given the same reference numbers. In this example, the computing site 110 discussed above with respect to FIG. 1 may be a first computing site 110(1), and a portion of the data 120 may be copied to a second computing site 110(2). For instance, the computing sites 110(1) and 110(2) may be geographically remote from each other such as to protect the stored data against a disaster or the like. In other examples, rather than being geographically remote the computing sites 110(1) and 110(2) may be geographically near to each other or at the same geographical location but otherwise able to provide redundancy protection in the event of failure of the one of the computing sites 110(1) and 110(2), such as by being located on a different server cluster, different network connection, different electrical circuit, or the like.

As one example, the system 200 may employ an active/passive disaster recovery strategy in which the user devices 108 write data to the first computing site 110(1), and the second computing site 110(2) receives a copy of the data for disaster recovery purposes. Further, while only two sites are illustrated in this example, more computing sites may be employed in other examples, and, for instance, storage computing device(s) 103 at the first computing site 110(1) may copy data to multiple storage systems at different multiple computing sites, respectively.

The second computing site 110 may include at least one storage computing device 203, which may include an instance of the storage program 122 and one or more storage devices 124, such as discussed above with respect to FIG. 1. The storage devices 124 may store data 220 which may include copy data 204 and local data 206. In this example, the storage program 122 may be executed on individual ones of the storage computing device(s) 103 at the first computing site 110(1) to enable one or more of the respective storage computing device(s) 103 to copy a portion of the data 120 from the storage computing device(s) 103 at the first computing site 110(1) to the storage computing device(s) 203 at the second computing site 110(2), such as for providing redundancy of the copied data 204 against disaster or other failure at the first site 110. For example, when a storage computing device 103 receives data in a data write request from a user device 108 or from an application 112, 114, 116, the storage computing device 103 may store the received data on the storage device(s) 124 and may mark the data as "data to be copied" 208 that is pending to be copied to the storage computing device(s) 203 at the second computing site 110(2). The data 120 may further include non-replicated data 212 that is not copied to the storage computing device(s) 203 at the second computing site 110(2).

Further, the data 220 at the second computing site 110(2) may include local data 206 that is not copied from the first computing site 110(1). For example, the local data 206 may include user data that is stored by one or more of the user devices 108 directly to the second storage system(s) 102(2), rather than just copied data 220 that is copied from the application computing device(s) 102 to the second storage system(s) 102(2). The local data 122 may further include system data corresponding to data stored directly to the storage computing device(s) 203 and system data generated by the second storage system(s) 102(2) related to the copied data 120.

Additionally, in some examples, the second computing site 110(2) may include components similar to the first computing site 110(1), and may include one or more application computing devices, one or more management computing devices, and may be configured for communication with a plurality of client devices 108 that may store data directly to the storage computing devices 203. In such an arrangement, storage computing devices 203 at the second computing site 110(2) may copy data from the second computing site 110(2) to the storage computing devices 103 at the first computing site 110(1) as a disaster recovery precaution or the like.

Furthermore, while several example configurations of systems 100 and 200 are described with reference to FIGS. 1 and 2, respectively, numerous other configurations will be apparent to those of skill in the art having the benefit of the disclosure herein. For instance, in the examples of FIGS. 1 and 2, the application computing device(s) 102, storage computing device(s) 103, 203, and the management computing device(s) 104 are illustrated as separate computing devices. However, in other examples, management computing device(s) 104 may be implemented on one or more of the application computing device(s) 102 and/or the storage computing device(s) 103, 203. Additionally, in some alternative examples, the application computing device(s) 102, the storage computing device(s) 103, and/or the management computing device(s) 104 may be implemented on a single physical computing device that assigns different resources for the application computing device(s) 102, the storage computing device(s) 103, and/or the management computing device(s) 104. As another example, the application computing device(s) 102, the storage computing device(s) 103, and/or the management computing device(s) 104 may be implemented as part of a pool of virtual machines and as part of a pool of containers at the first computing site 110(1). Similarly, the storage computing device(s) 203 may be implemented as part of a pool of virtual machines and as part of a pool of containers at the second computing site 110(2). Additionally, as still another example, the application computing device(s) 102, the storage computing device(s) 103, and/or the management computing device(s) 104 may be implemented as a cluster of physical servers at the first computing site 110(1) where the data is stored in a distributed manner, and the storage computing device(s) 203 may be implemented on a cluster of physical servers at the second computing site 110(2).

Figure 3:
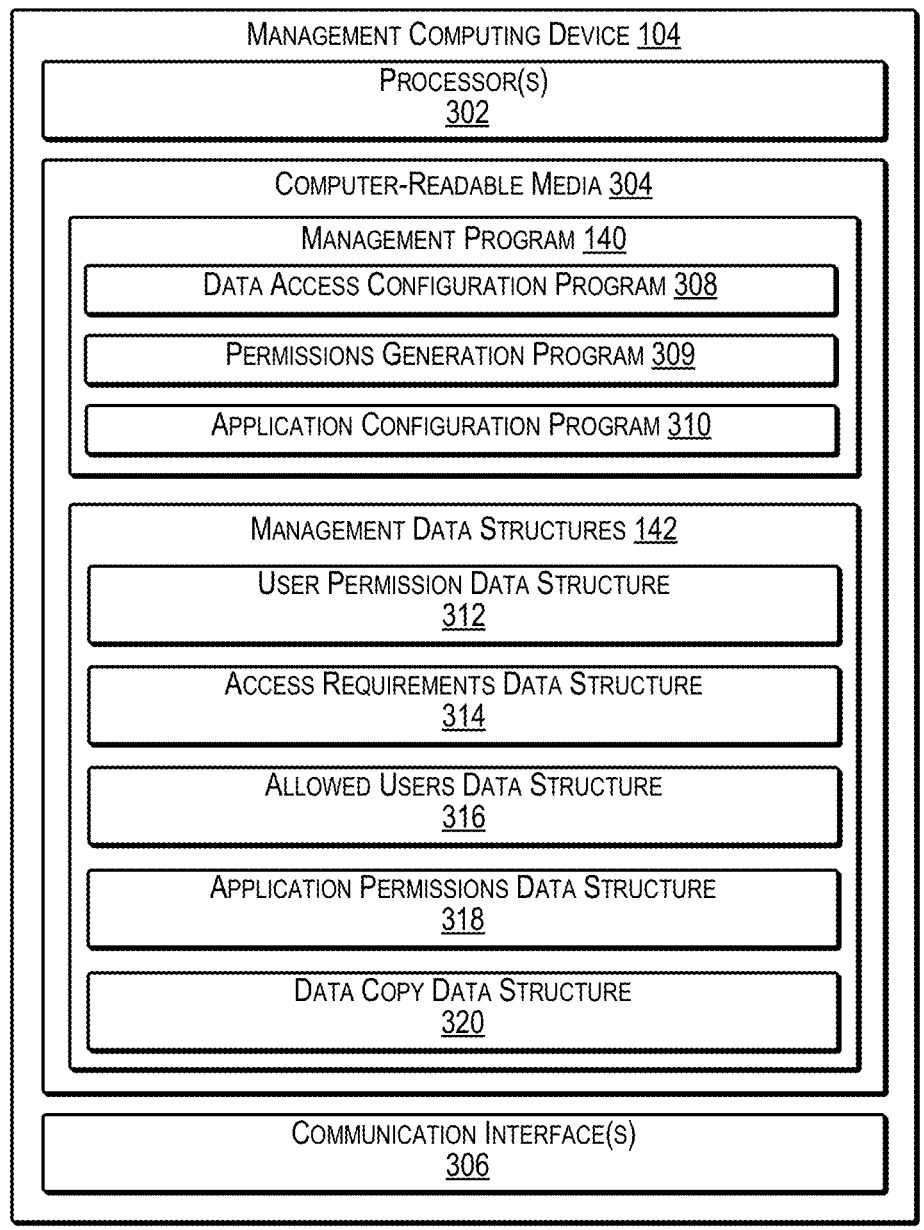
FIG. 3 illustrates an example hardware and logical configuration of a management computing device according to some implementations.

FIG. 3 illustrates an example hardware and logical configuration of a management computing device 104 according to some implementations. In some examples, the management computing device 104 may include one or more servers that may be embodied in any number of ways. For instance, the programs, other functional components, and at least a portion of data storage of the management computing device 104 may be implemented on at least one server, such as in a cluster of servers, a server farm, a data center, a cloud-hosted computing service, and so forth, although other computer architectures may additionally or alternatively be used. In the illustrated example, the management computing device 104 includes, or may have associated therewith, one or more processors 302, one or more computer-readable media 304, and one or more communication interfaces 306.

Each processor 302 may be a single processing unit or a number of processing units, and may include single or multiple computing units, or multiple processing cores. The processor(s) 302 may be implemented as one or more central processing units, microprocessors, microcomputers, microcontrollers, digital signal processors, state machines, logic circuitries, and/or any devices that manipulate signals based on operational instructions. As one example, the processor(s) 302 may include one or more hardware processors and/or logic circuits of any suitable type specifically programmed or configured to execute the algorithms and processes described herein. The processor(s) 302 may be configured to fetch and execute computer-readable instructions stored in the computer-readable media 304, which may program the processor(s) 302 to perform the functions described herein.

The computer-readable media 304 may include both memory and storage. For example, the computer-readable media 304 may include volatile and nonvolatile memory and/or removable and non-removable media implemented in any type of technology for storage of information, such as computer-readable instructions, data structures, program modules, or other data. The computer-readable media 304 may include, but is not limited to, RAM, ROM, EEPROM, flash memory or other memory technology. Further, the computer-readable media 304 may include any of magnetic disk storage, solid-state storage, optical storage, magnetic tape, storage arrays, network-attached storage, storage area networks, cloud storage, or any other medium that can be used to store the desired information and that can be accessed by a computing device. Depending on the configuration of the management computing device 104, the computer-readable media 304 may include a tangible non-transitory computer-readable media to the extent that, when mentioned, non-transitory computer-readable media exclude media such as energy, carrier signals, electromagnetic waves, and/or signals per se. In some cases, the computer-readable media 304 may be at the same location as the management computing device 104, while in other examples, a portion of the computer-readable media 304 may be partially remote from the management computing device 104. For instance, in some cases, the computer-readable media 304 may include a portion of storage located over a network from the management computing device 104.

The computer-readable media 304 may be used to store any number of functional components that are executable by the processor(s) 302. In many implementations, these functional components comprise instructions or programs that are executable by the processor(s) 302 and that, when executed, specifically program the processor(s) 302 to perform the actions attributed herein to the management computing device 104. Functional components stored in the computer-readable media 304 may include the management program 140, which in this example includes a data access configuration program 308, a permissions generation program 309, and an application configuration program 310, each of which may include one or more computer programs, applications, executable code, or portions thereof, as discussed additionally below.

In addition, the computer-readable media 304 may store data, data structures, and other information used for performing the functions and services described herein. For example, the computer-readable media 304 may store the management data structures 142, which may include a user permission data structure 312, an access requirements data structure 314, an allowed users data structure 316, an application permissions data structure 318, and in the case of the system of FIG. 2, a data copy data structure 320. Each of these data structures 312-320 is discussed additionally below.

The management computing device 104 may also include or maintain other functional components and data, which may include an operating system and other programs, drivers, etc., and the data used or generated by the functional components. Further, the management computing device 104 may include many other logical, programmatic, and physical components, of which those described above are merely examples that are related to the discussion herein.

The one or more communication interfaces 306 may include one or more software and hardware components for enabling communication with various other devices, such as over the one or more networks 106. Thus, the communication interfaces 306 may include, or may couple to, one or more ports that provide connection to the network(s) 106 for communicating with the application computing device(s) 102, the storage computing device(s) 103, the user devices 108 and/or the administrative device 105. For example, the communication interface(s) 306 may enable communication through one or more of a LAN, the Internet, cable networks, cellular networks, wireless networks (e.g., Wi-Fi) and wired networks (e.g., Fibre Channel, fiber optic, Ethernet, Infini-Band), direct connections, as well as close-range communications such as BLUETOOTH®, and the like, as additionally enumerated elsewhere herein.

FIG. 4 illustrates an example of a user permission data structure 312 according to some implementations. The user permission data structure 312 includes a user ID or hundred and two, a display name 404, read permissions 406 for the respective user, and write permissions 408 for the respective user. For instance, the user ID 402 may be any alphanumeric value, a text value, or the like, and may be automatically generated by the system or may be defined by the administrative user 146. Further, the user ID may be unique or otherwise individually distinguishable within the respective system 100, 200, and therefore is not repeated in the different rows of the user permission data structure 312. Additionally, the display name 404 may include a human readable name that represents a respective user, and which may be defined by the respective user 127 or the administrative user 146.

In addition, the read permissions 406 may include a list of one or more data locations in the storage computing device(s) 103 at which the respective user is permitted to read data. For example, the data location may be represented by a data path to a folder in a filesystem. In some examples, the data location may also include conditions with a prefix for the data path. Additionally, in some examples, the data location may also include conditions related to metadata associated with the data. Examples of metadata may include creation time, type of data, and/or any of various other types of metadata.

Furthermore, the write permissions 408 may include a list of one or more data locations in the storage computing device(s) 103 at which the user corresponding to the respective user ID is permitted to write data. The data location may be represented as a data path to a folder in a filesystem or the like. In some examples, the data location may also include conditions for a prefix for the data path. For example, the prefix "/assets/images/" is a condition that indicates that the corresponding user is allowed to access data whose path starts with "/assets/images/" such as "/assets/images/red-logo.png" and "/assets/images/small-logo.png", and the corresponding user is not allowed to access data whose path does not start with "/assets/images/" such as "/document.pdf", "/assets/notes.txt" and "/assets/docs/summary.pdf". In some examples, the data location may also include conditions related to accessing the metadata associated with the data. For example, a condition "only data" indicates that the corresponding user is allowed to access the data but not the metadata such as the "owner" of the data and the "creation date" of the data. Examples of such metadata are recited above.

In this example, each respective row includes information of data access permissions for a user 127 discussed above with respect to FIGS. 1 and 2. As mentioned above, a user 127 may be an individual user or may be a group of individuals such as a team, a department, or any other group that may be created or otherwise designated by the administrator user. For instance, in this example, the users include a human resources (HR) team, a North sales department, and a South sales department. Further, implementations herein are not limited to any particular number of users of the respective systems 100, 200. Furthermore, while the example user permission data structure 312 illustrated in FIG. 4 includes columns for read permissions 406 and write permissions 408, in other examples the user permission data structure 312 may further include columns to represent permissions for other types of data operations such as delete, overwrite, read metadata, and write metadata.

FIG. 5 illustrates an example of an application access requirements data structure 314 according to some implementations. The application access requirements data structure 314 includes columns including application 502, use case 504, input requirements 506, output requirements 508, additional read requirements 510, and additional write requirements 512. Furthermore, each row of the application access requirement data structure 314 provides information of the data access requirements for a particular use case of the corresponding application 502. For example, the application 502 may be identified by an identifier that represents the application, which may be a numeric value, alphanumeric value, text value, or the like. The identifier may be automatically generated by the system or may be defined by the administrator user 146. Additionally, the use case 504 may provide information that represents a use case for the respective application 502. The use case may be descriptive of the particular use case and may be a text value or other suitable information. For instance, in the example illustrated, for application ETL a first use case is described as "data filtering", while a second use case is described as "data sorting".

In addition, the input requirements 506 may indicate whether or not the use case for the application can accept input data that is read from the storage computing device(s) 103. For example, a "required" entry indicates that input data is required, while a no entry indicates that input data is not accepted for the corresponding use case for the application. In some examples, the input requirements may also include conditions related to the metadata associated with the data, such as type of metadata or the like. Similarly, the output requirements 508 may also have one of two values, e.g., "required" or "no". As discussed above, a "required" value may indicate that data will be output by the application for the particular use case, whereas a "no" value indicates that data is not output by the application for the particular use case.

Furthermore, the additional read requirements 510 may provide a list of one or more data locations in the storage computing device(s) 103 from which the particular use case for the particular application should read the data when the input requirements indicate that input data is required. For instance, the data location may be represented by a path to a folder in a filesystem. In some examples, the data location may also include conditions with a prefix for the data path. Further, in some examples, the data location may include conditions related to metadata associated with the data such as creation time, type of data, etc. Similarly, the additional write requirements may provide a list of one or more data locations in the storage computing device(s) 103 to which the particular use case for the particular application should write the data when the output requirements indicate that output data is required. For instance, the data location may be represented by a path to a folder in a filesystem. In some examples, the data location may also include conditions with a prefix for the data path. Further, in some examples, the data location may include conditions related to metadata associated with the data such as creation time, type of data, etc.

The access requirements data structure 314 may have any number of rows. In some examples, the rows may be added or removed in response to requests by the administrator user 146, such as to add, modify, and/or delete applications from the access requirements data structure 514. Additionally, in some examples, the rows may be added or deleted automatically when applications are automatically provisioned or removed from the systems 100 or 200. Furthermore, some of the columns may be populated with default values and/or some of the columns may be populated with values provided by application authors, vendors, or by a third-party entity. In addition, the illustrated example represents requirements and additional requirements for two types of data operations, i.e., read and write. The access requirements data structure 314 may be extended with more columns to represent other types of data operations such as delete, overwrite, read metadata, and write metadata. In some cases, the administrator user 146 may determine the information stored in the access requirements data structure 314, while in other cases, the information may be received from an author or other supplier of the respective application, or the like.

FIG. 6 illustrates another example of an application access requirements data structure 314 according to some implementations. The application access requirements data structure 314 in this example may correspond, in some cases, to the example system 200 set forth in FIG. 2. Accordingly, in this example, in addition to the application 502, the use case 504, the input requirements 506, the output requirements 508, the additional read requirements 510, and the additional write requirements 512. The access requirements data structure 314 further includes a data copy allowed value 602, which may be a Boolean value such as "yes" or "no". The data copy allowed value 602 indicates whether the data associated with the particular application use case is permitted to be copied to the storage computing device(s) 203 at the second computing site 110(2) discussed above with respect to FIG. 2 ("yes") or not permitted to be copied ("no").

For example, certain types of data generated by particular application use cases might not be permitted to be copied to a remote computing system 110(2), such as based on user security concerns, law prohibiting the transfer of data outside a country, and so forth. Accordingly, the restrictions indicated by the data copy allowed value 602 may be useful for complying with data governments and to avoid sensitive data being copied to an external location. Furthermore, this feature may also be used to avoid consuming resources to copy data to the second computing system 110(2) when that data does not need to be copied, such as because the data may be short-lived and/or does not otherwise require redundancy protection. Furthermore, the data copy allowed value may be specific to the particular use case and may be different in different rows of the access requirements data structure 314.

FIG. 7 illustrates an example of an allowed users data structure 316 according to some implementations. The allowed users data structure 316 indicates which users are able to configure applications for which use cases, and has columns including application 702, use case 704, and allowed user's 706. For example, the application 702 may indicate the name or other identifier of the corresponding application 702. For instance, the identifier may be an alphanumeric value, a text name, or the like. The identifier may be automatically generated by the system, or may be specified by the administrative user 146. The use case 704 provides an identifier that represents a use case for the corresponding application 702, and may be a descriptive name, numerical value, or the like. This identifier also may be automatically generated by the system or specified by the administrator user 146.

The allowed users 706 includes a list of one or more users 127 represented by the same user ID 402 as was used in the user permission data structure 312. The user ID of the respective permitted users may appear and multiple rows of the allowed users data structure 316. For instance, the allowed users 706 indicates those users that are allowed to configure jobs and set the jobs for execution the application identifier for the use case 704 of the corresponding application 702. The identifier of the application 702 may be unique or otherwise individually distinguishable within the system 100, 200 for the same application, and it is not repeated in the different rows of the allowed users data structure 316 for the same combination of application 702 and use case 704.

The allowed users data structure 316 may include any number of rows that are added or deleted in response to a request by the administrator user to allow or disallow the users 127 to configure applications and corresponding use cases. Furthermore, the rows of the allowed users data structure 316 may be added or deleted automatically when applications are automatically provisioned or removed from the system 100, 200. For example, there may be a default value for the allowed users 706 for added applications.

FIG. 8 illustrates an example of an application permissions data structure 318 according to some implementations. The application permissions data structure 318 may be generated based in part on information from the user permission data structure 312, the application access requirements data structure 314, and the allowed users data structure 316. In the illustrated example, the application permissions data structure 318 has columns including permission identifier 802, user identifier 804, application 806, use case 808, read permissions 810, and write permissions 812. Each row of the application permissions data structure 318 may correspond to a permission identifier and may indicate the permissions assigned for executing respective jobs on behalf of users 127. For example, the permission ID 802 may be an ID that represents a set of permissions e.g., the read permissions 810 and the write permissions 812 for accessing identified data. The permission ID 802 may be automatically generated by the system, or may be designated by the administrator user 146.

Furthermore, the user ID 804 is an identifier that represents a particular user 127 with a numerical value, text value, or the like. The user ID 804 may be automatically generated by the system or may be defined by the administrative user 146 for identifying a particular user 127, and may be unique or otherwise individually distinguishable within the system 100, 200. The application 806 may indicate the name of the application within the system 100, 200, and may be a text or numerical value that may be unique or otherwise individually distinguishable for identifying the particular application within the system 100, 200. The identifier for the application may be generated automatically by the system, or may be assigned by the administrator user 146.

The use case 806 may be a name that is descriptive of a particular use case for the corresponding application 806, and may be automatically generated by the system or defined by the administrator user 146. The identifier for the use case 806 may be unique or otherwise individually distinguishable for the same application 806 and user ID 804, and is not repeated in different rows of the application permission data structure 318 for the same application 806 and user 804 combination.

Furthermore, the read permissions 810 may include a list of one or more data locations in the storage computing device(s) 103 from which the respective application is permitted to read data when executing a job that has been configured by the user 127 corresponding to the user ID 804 for the respective use case 806. For example, the data location may be represented by a data path to a folder in a filesystem. In some examples, the data location may also include conditions with a prefix for the data path. Additionally, in some examples, the data location may also include conditions related to metadata associated with the data. Examples of metadata may include creation time, type of data, and/or any of various other types of metadata.

In addition, the write permissions 812 may include a list of one or more data locations in the storage computing device(s) 103 at which the application 806 corresponding to the respective permission ID 802 is permitted to write data when executing a job that has been configured by the user 804 for the corresponding use case 808. The data location may be represented as a data path to a folder in a filesystem or the like. In some examples, the data location may also include conditions for a prefix for the data path. Further, the data location may also include conditions related to accessing the metadata associated with the data. Examples of metadata may include creation time, type of data, and/or any of various other types of metadata.

The application permissions data structure 318 may have any number of rows which may be added, modified, and/or deleted by the data access configuration program 308 that may be executed as part of the management program 140 discussed above with respect to FIGS. 1-3. Furthermore, in some examples, the administrator user 146 may also add, modify, and/or delete rows in the application permissions data structure 318, and may also prevent rows from being modified by the data access configuration program 308 and/or other portions of the management program 140. For instance, in some examples, the data access permissions for a particular application, particular use case, and particular user may be desired to be different from the automatically generated data access permissions that might otherwise be entered into the data access permissions data structure 318.

In some examples, the management program 140 may group multiple rows into a single row when the read permissions 810 and the right permissions 812 are the same for multiple permission IDs 802, user IDs 804, applications 806, and application use cases 808. This grouping of rows may reduce the table size and speed up the query time for determining application data access permissions in response to data access requests received by the source computing devices 103.

Furthermore, in the illustrated example, the application permissions data structure 318 represents data access permissions for two types of data operations, namely, read and write. The application permissions data structure 318 may be expanded in other examples to include other types of data operations such as delete, overwrite, read metadata, and write metadata.

FIG. 9 illustrates an example of the data copy data structure 320 according to some implementations. The data copy data structure 320 in this example includes a source 902 and a destination 904, and each row indicates data copy configurations for the system 200 of FIG. 2. The data copy data structure 320 may have any number of rows which may be added or deleted in response to a request from the administrator user 146, such as for configuring data copy settings for copying data from a data location in the first computing system 110(1) to a data location in the second computing system 110(2) of FIG. 2.

In this example, the source 902 may identify the path of data at the first computing system 110(1) of FIG. 2 at which data is stored, which may be a path to a folder in a file system. The source path indicates data that is to be copied to the destination storage computing devices 203 of FIG. 2. In some cases a data location may include conditions with a prefix for the data path and/or may include conditions related to metadata associated with the data. Examples of metadata may include creation time, type of data, and/or any of various other types of metadata.

Additionally, the destination 904 may represent the path for storing data at the storage computing device 203 at the second computing system 110(2) of FIG. 2 to which the corresponding data from the source 902 is copied. For instance, the path may correspond to a folder in a filesystem. In some examples, the data location may include conditions with a prefix for the data path and/or the data location may include conditions related to the metadata associated with the data. Examples of metadata may include creation time, type of data, and/or any of various other types of metadata.

FIG. 10 illustrates another example of the application permissions data structure 318 according to some implementations. The application permissions data structure 318 in this example may correspond to the example system of FIG. 2 in some cases, and has columns including permission identifier 802, user identifier 804, application 806, use case 808, read permissions 810, and write permissions 812. The access permissions data structure 318 in this example may also further limit the write permissions for certain permission IDs from being copied to the storage computing device(s) 203 at the second computing site 110(2) discussed above with respect to FIG. 2.

As an example, as indicated at 1002, the path to a global folder "/shares/HR_global" folder has been removed from the write permissions 812 based on the data copy data structure 320 discussed above with respect to FIG. 9. For instance, suppose that the data output by the job PID-7 is not desired to be copied to the second computing system 110(2), such as for legal reasons, confidentiality reasons, or any of various other reasons. Accordingly, because the "/shares/HR_global" folder is configured to be replicated from the first computing site 110(1) to the "/remote_shares/HR_global" folder at the second computing site 110(2), as indicated in the first row of the data copy data structure 320, the "/shares/HR_global" is removed from the write permissions for the application use case corresponding to PID-7 in the example data structure 318 of FIG. 10, as indicated at 1002. Accordingly, this technique can prevent unintentional copying of data from the first computing site 110(1) to the second computing site 110(2) that might otherwise result from execution of the particular PID-7 application use case at the first computing site 110(1).

Figure 11:
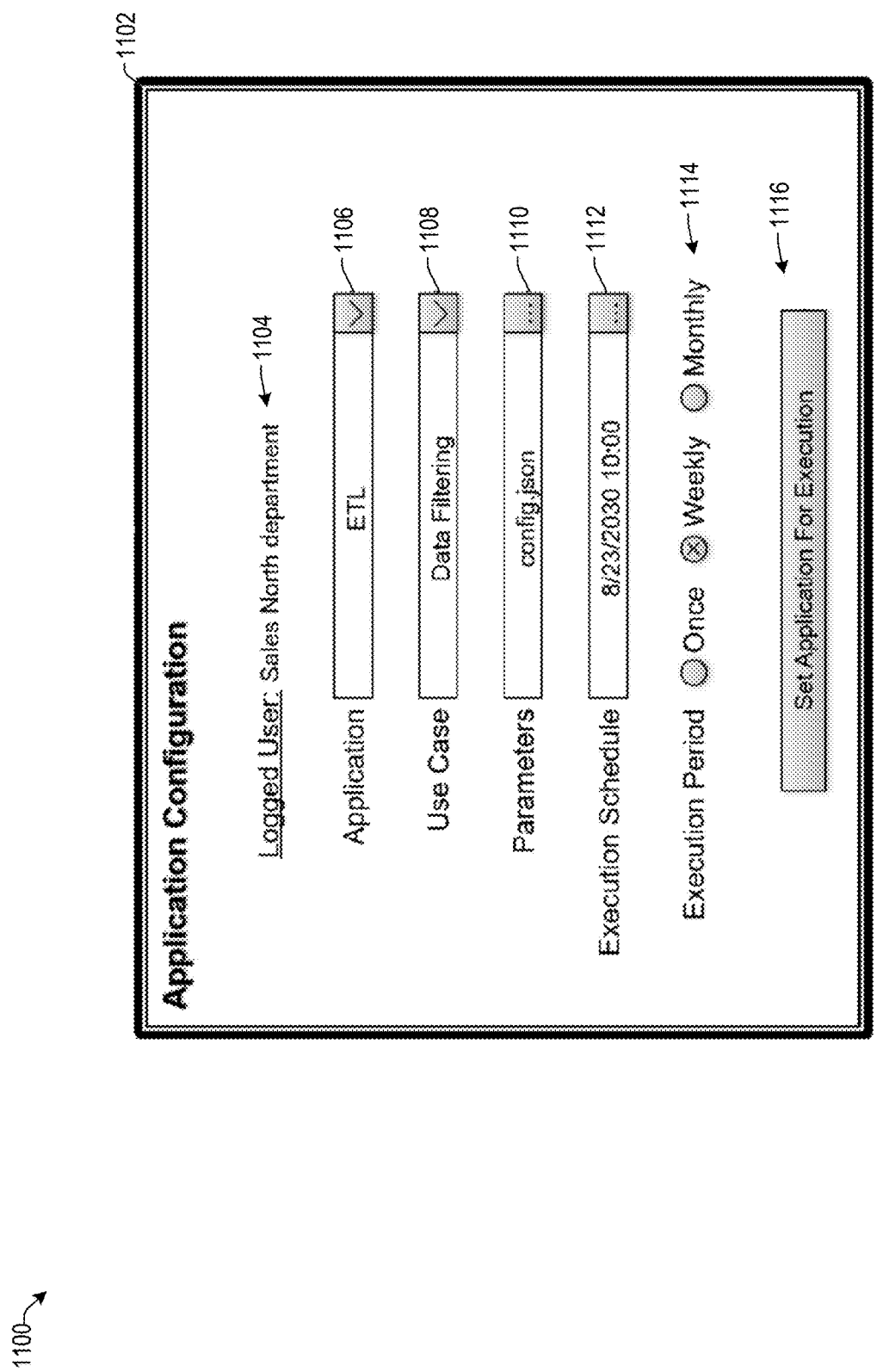
FIG. 11 illustrates an example graphical user interface (GUI) that may be used for configuring an application according to some implementations.

FIG. 11 illustrates an example graphical user interface (GUI) 1100 that may be used for configuring an application according to some implementations. In some examples, the GUI 1100 may be generated by the management computing device 104 or other suitable computing device, such as by execution of the application configuration program 310 of the management program 140. For instance, the GUI 1100 may be presented on a display 1102 for viewing by a user 127 of a user device 108, and the display 1102 may be in communication with or otherwise associated with the user device 108. At 1104, the GUI 1100 may identify the user 127 who is currently logged in to the user computing device 108, which in this example is indicated to be a member of the Sales North Department.

In addition, the GUI 1100 includes a plurality of user-interactive virtual controls including an application drop-down menu 1106, a use case drop-down menu 1108, a parameters field 1110, an execution schedule field 1112, a plurality of "execution period" radio buttons 1114, and a "set application for execution" button 1116. For example, the logged-in user identifier at 1104 shows the display name of the user 127 who is currently logged in and interacting with the GUI 1100. Displaying the user ID in this manner may be useful to remind the respective users 127 that the scheduled application job being created will be executed based in part on the data access permissions associated with the logged-in user account. Displaying the user ID at 1104 may also be useful to remind the users 127 of the particular user account to which they are logged in, as there may be some individuals who have more than one user account, such as an individual account and a group account.

The application menu 1106 may allow the user interacting with the GUI 1100 to select an application from one of the rows in the drop-down menu 1106, which in some cases, may correspond to the application identifiers listed in the allowed users data structure 316 discussed above with respect to FIG. 7. For instance, based on the information included in the example allowed users data structure 316 of FIG. 7, the Sales North users are allowed to select the ETL application or the Visualizer application, but are not allowed to select the Repository application. Accordingly, the repository application may not be presented as one of the options for selection in the drop-down menu 1106.

The use case drop-down menu 1108 may enable the user to select a particular use case for the selected application indicated at 1106. For example, based on the first and second rows of the allowed users data structure 316 of FIG. 7, the Sales North users are able to select use cases of data filtering or data sorting for the ETL application. Accordingly, these may be the only options presented by the use case drop-down menu 1108 since these are the only use cases indicated to be permitted for selection to the logged in user by the allowed users data structure 316. Furthermore in some examples, the drop-down menu 1108 may automatically display a default value based on the user selection of the application and the drop-down menu 1106. In addition, not all applications might have multiple use cases. In such a situation, the use case drop-down menu 1108 may be blank, or may otherwise indicate that it is not applicable to the selected application.

The parameters field 1110 may enable the user to enter a set of configuration parameters for use during execution of the application selected at 1108. As one example, the GUI 1100 may guide users through a wizard to decide each of the available configuration parameters for the selected application 1106 and use case 1108. Additionally, or alternatively, the GUI allows users to select a file or upload a file that contains a set of parameters such as in a specified format (e.g., JSON format, XML format, etc.). In some examples, the parameters field 1110 may display a default value when the application and/or use case is selected by the user. The input field 2406 can have a default value already selected when users start the interaction with the interface. Examples of configuration parameters are a script with operations to read input data, transform the data, and store the output data.

The execution schedule field 1112 may enable the user to select a date and time for execution of the application selected at 1106 using the parameters specified at 1110 and according to the selected use case selected at 1108, if any. In some examples, the execution schedule field may be populated using a default value already selected when the user specifies the selected application at 1106. The GUI 1100 may also be configured to present a set of available date and time slots from which the user can select a desired date and time. In addition, the execution. Radio buttons at 1114 may enable the user to specify whether the application is to execute only once, or on a recurring basis such as weekly or monthly. In some cases, a default value may already be selected when the user specifies the application at 1106. Furthermore, some users and/or some applications and/or some use cases may not have all three options available. For example, some applications/use cases may only enable a one-time execution.

The "set application for execution" button 1116 may enable the user to cause the application configuration program 310 of the management program 140 to proceed with scheduling the selected application as a job for execution according to the specified parameters and use case at the specified date and time. In some examples, the GUI 1100 may present a confirmation dialog after the "set application for execution" button 1116 is selected and the job execution has been successfully scheduled. Furthermore, in some examples, the user may receive a notification from the management program 140 when the job has been completed.

FIGS. 12-15 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 12:
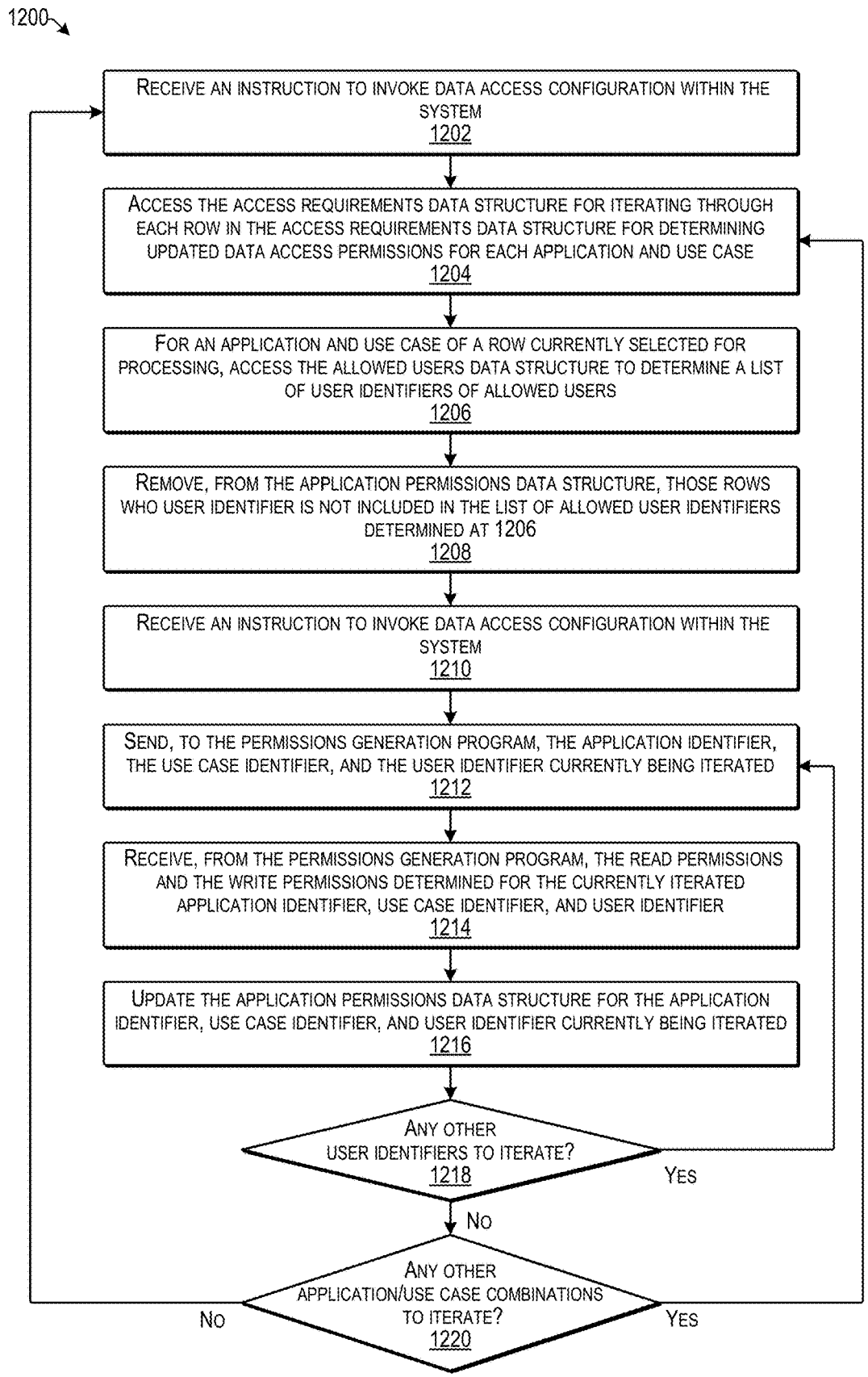
FIG. 12 is a flow diagram illustrating an example process for configuring data access permissions according to some implementations.

FIG. 12 is a flow diagram illustrating an example process 1200 for configuring data access permissions according to some implementations. For example, the management computing device 104, or other suitable computing device, may execute the data access configuration program 308 of the management program 140 to perform at least a portion of the process 1200.

At 1202, the computing device may receive an instruction to invoke the data access configuration within the system 100 or 200 discussed above. For example, data access configuration may be initiated by an instruction generated based on a change in the values in the user permission data structure 312, the access requirements data structure 314, and/or the allowed users data structure 316. Additionally, or alternatively, data access configuration may be initiated by an instruction received from the administrator user 146, such as when multiple changes have been made to one of the above-mentioned data structures. As another alternative, data access configuration may be initiated when one or more users 127 interact with the system 100, such as via the application configuration GUI 110 as discussed above with respect to FIG. 11.

At 1204, the computing device may access the access requirements data structure 314 and may iterate through each row in the access requirements data structure 314 for determining updated data access permissions for each application and use case based on the following operations and by considering all allowed users, as discussed below. Additionally, in the situation in which there are not multiple use cases for the respective applications, then the process 1200 may simply iterate through the applications and users. Further, as another example, to minimize the computer processing requirements, rather than iterating through each application and use case in the access requirements data structure 314, the process 1200 can only iterate through the applications and use cases that are related to changes in the user permission data structure 312, the access requirements data structure 314, and the allowed users data structure 316 since the last time the data access configuration process was executed.

At 1206, based on an application and use case of a row currently selected for processing, the computing device may access the allowed users data structure 316 to determine a list of user identifiers of allowed users 706 for the currently selected application 702 and use case 704. For example, if the application and use case currently being iterated is "ETL" and "Data Sorting", respectively, the list of allowed users determined is "UID-SN" and "UID-SS".

At 1208, based on an application and use case of a row currently selected for processing, the computing device may locate rows in the application permissions data structure 318 that match the application and use case currently being iterated, and removes from the application permissions data structure 318 those rows who user identifier 804 is not included in the list of allowed user identifiers determined at block 1206. Thus, the operation at 1208 may remove permissions for applications and users when a user 127 is no longer permitted to use that application.

At 1210, the computing device may iterate through each user identifier retrieved at block 1206 for executing the permissions generation process discussed below with respect to FIGS. 13 and 15. Alternatively, to reduce processing requirements, the computing device may only iterate through user identifiers that are related to changes in the user permission data structure 312, the access requirements data structure 314, and the allowed users data structure 316 since the last time the data access configuration process was executed.

At 1212, the computing device may invoke the permissions generation program 309 to execute the process 1300, 1500 discussed below with respect to FIGS. 13 and 15, respectively, and sends, to the permissions generation program 309, the application identifier and the use case identifier currently being iterated from block 1204, and the user identifier currently being iterated from block 1208.

At 1214, the computing device may receive, from the permissions generation program 309, the read permissions and the write permissions determined by the permissions generation program 309 for the currently iterated application identifier, use case identifier, and user identifier.

At 1216, the computing device may update the application permissions data structure 318 by searching for an existing row that has the application identifier, use case identifier, and user identifier currently being iterated. If an existing row is found, the computing device updates the read permissions 810 and write permissions 812 for the existing row using the read permissions and the write permissions determined by the permissions generation program 309. On the other hand, if an existing row is not found, the computing device creates a new row in the application permissions data structure 318 with the application identifier, use case identifier, and user identifier currently being iterated and uses the read permissions and the write permissions determined by the permissions generation program 309 as the read permissions 810 and write permissions 812 for the new row.

Further, the computing device assigns a new permission ID 802 to the new row, such as by using sequential integers or any other suitable technique. Additionally, if the read permissions and/or write permissions received from the permissions generation program 309 are blank or null, then the entry in the row may be blank or null.

At 1218, the computing device determines whether all of the user identifiers determined at block 1206 have been iterated. If not, the process returns to 1208 to iterate the next user identifier. If so, the process goes to 1220.

At 1220, the computing device determines if all application and use cases have been iterated. If not, the process returns to 1204 to iterate a next application and use case combination. If so, the process goes to 1202 to await a next invocation of the data access configuration program 308.

Implementations herein may determine the data access permissions when performing the data access configuration process 1200, and thereby to avoid a time-consuming and error-prone alternative of having administrators manually deciding and entering the permission values for each combination of application, use case, and allowed user. The examples herein also avoid a situation in which administrators need to modify manually the entered permissions every time there is a change in application requirements or user permissions. Furthermore, by performing the computations and data permission decisions in advance and storing the data access permissions for all applications, use cases, and allowed users, the examples herein may avoid the inefficient and slow alternative of computing the data access permissions in response to each data access request received from an application.

Figure 13:
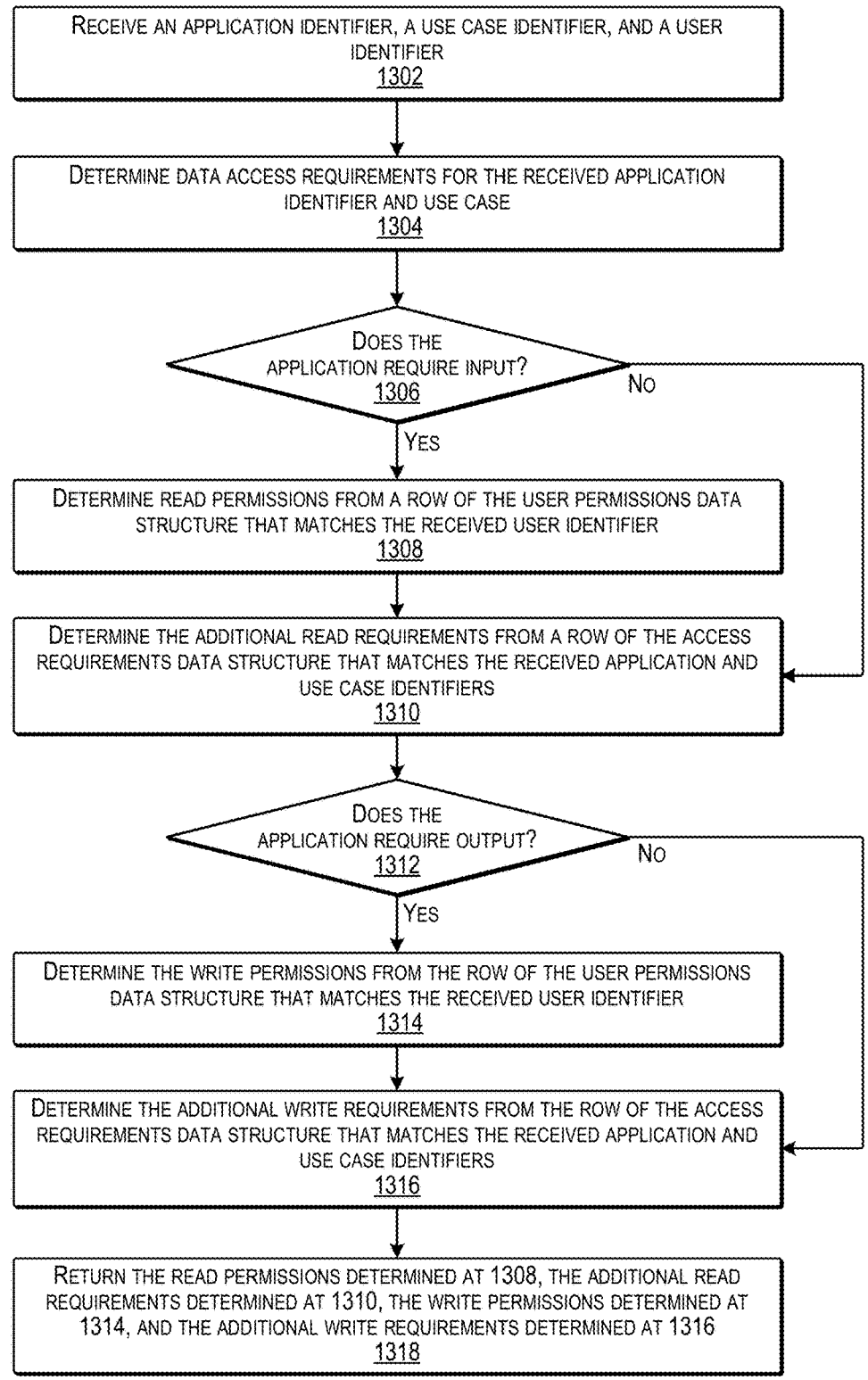
FIG. 13 is a flow diagram illustrating an example process for determining application data access permissions according to some implementations.

FIG. 13 is a flow diagram illustrating an example process 1300 for determining application data access permissions according to some implementations. For example, the management computing device 104, or other suitable computing device, may execute the permissions generation program 309 of the management program 140 to perform at least a portion of the process 1300. For example, the permissions generation program 309 may be invoked by the data access configuration program 308, such as at block 1212 discussed above with respect to FIG. 12.

At 1302, the computing device may receive an application identifier, a use case identifier for the identified application, and a user identifier such as discussed above with respect to block 1212 of FIG. 12. For example, these inputs may be received from the data access configuration program 308, At 1304, the computing device may determine data access requirements for the identified application and use case by accessing the access requirements data structure 314. For example, the computing device may locate a row in the access requirements data structure 314 in which the application 502 and the use case 504 match the received application and use case.

At block 1306, the computing device may determine, based on the input requirements 506 of the access requirements data structure 314, whether the application requires an input. If so, the process goes to 1308. If not, the process goes to 1310.

At block 1308, the computing device may determine the Read Permissions 406 from a row of the user permissions data structure 312 that matches the user identifier.

At block 1310, the computing device may determine the Additional Read Requirements 510 from a row of the access requirements data structure 314 that matches the received application and use case identifiers.

At block 1312, the computing device may determine from the row of the access requirements data structure 314 that matches the received application and use case identifiers whether the Output Requirements 508 indicate that an output is required. If so, the process goes to 1314. If not, the process goes to 1316.

At block 1314, when output is required, the computing device may determine the Write Permissions 408 from the row of the user permissions data structure 312 that matches the received user identifier.

At block 1316, the computing device may determine the Additional Write Requirements 512 from the row of the access requirements data structure 314 that matches the received application and use case identifiers.

At block 1318, the computing device returns the Read Permissions determined at 1308, the Additional Read Requirements determined at 1310, the Write Permissions determined at 1314, and the Additional Write Requirements determined at 1316. These results are stored in the application permissions data structure 318 as Read Permissions 810 and Write Permissions 812, respectively, and in a row corresponding to the received user identifier, application identifier, and a use case identifier. For example, if the row already exists, the Read Permissions 810 and Write Permissions 812 are updated. If the row does not already exist, a new row may be added to the application permissions data structure 318, and a new PID 802 may be assigned. The generation or updating of the application permissions data structure 318 may be performed by the data access configuration program 308 in some cases, but may alternatively be performed by the permissions generation program 309.

As one concrete example, suppose that the values received by the computing device at block 1302 are application "ETL", use case "Data Sorting", and user identifier "UID-SN".

At block 1304, the computing device may determine that the second row 514 in the access requirements data structure 314 matches the received application and use case.

At block 1306, the computing device may determine, based on the input requirements 506 of the access requirements data structure 314, that ETL and Data Sorting require input.

At block 1308, the computing device may determine from the second row 410 of the user permissions data structure 312 that the Read Permissions 406 for UID-SN are "/shares/sales/north" and "/shares/sales_history".

At block 1310, the computing device may determine from the second row 514 of the access requirements data structure 314 that the Additional Read Requirements 510 for application "ETL" and use case "Data Sorting" is "/temporal".

At block 1312, the computing device may determine from the second row 514 of the access requirements data structure 314 and the Output Requirements 508 that application "ETL" and use case "Data Sorting" require output.

At block 1314, the computing device may determine from the second row 410 of the user permissions data structure 312 that the Write Permissions 408 for UID-SN is "/shares/sales/north".

At block 1316, the computing device may determine from the second row 514 of the access requirements data structure 314 that the Additional Write Requirements 512 for application "ETL" and use case "Data Sorting" is "/temporal".

At block 1318, the computing device returns "/shares/sales/north", "/shares/sales_history", and "/temporal" as Read Permissions 810. Further, the computing device returns "/shares/sales/north" and "/temporal" as Write Permissions 812. These results are stored in the application permissions data structure 318 at the second row 814, and corresponding to the permission identifier PID-2.

As another concrete example, suppose that the values received by the computing device at block 1302 are application "Repository", use case "Template Generation", and user identifier "UID-HR".

At block 1304, the computing device may determine that the fourth row 516 in the access requirements data structure 314 matches the received application identifier and use case identifier.

At block 1306, the computing device may determine, based on the input requirements 506 of the access requirements data structure 314, that Repository and Template Generation do not require input. Accordingly, the process skips block 1308.

At block 1310, the computing device may determine from the fourth row 516 of the access requirements data structure 314 that the Additional Read Requirements 510 for application "Repository" and use case "Template Generation" is "ishares/repo".

At block 1312, the computing device may determine from the fourth row 516 of the access requirements data structure 314 and the Output Requirements 508 that application "Repository" and use case "Template Generation" require output.

At block 1314, the computing device may determine from the first row 412 of the user permissions data structure 312 that the Write Permissions 408 for UID-SN are "/shares/HR" and "/shares/HR_global".

At block 1316, the computing device may determine from the fourth row 516 of the access requirements data structure 314 that there are no Additional Write Requirements 512 for application "Repository" and use case "Template Generation".

At block 1318, the computing device returns "ishares/repo" as Read Permissions 810. Further, the computing device returns "/shares/HR" and "/shares/HR_global" as Write Permissions 812. These results are stored in the application permissions data structure 318 at the seventh row 816, and corresponding to PID-7, as indicated at 818 and 820, respectively, of FIG. 8.

Figure 14:
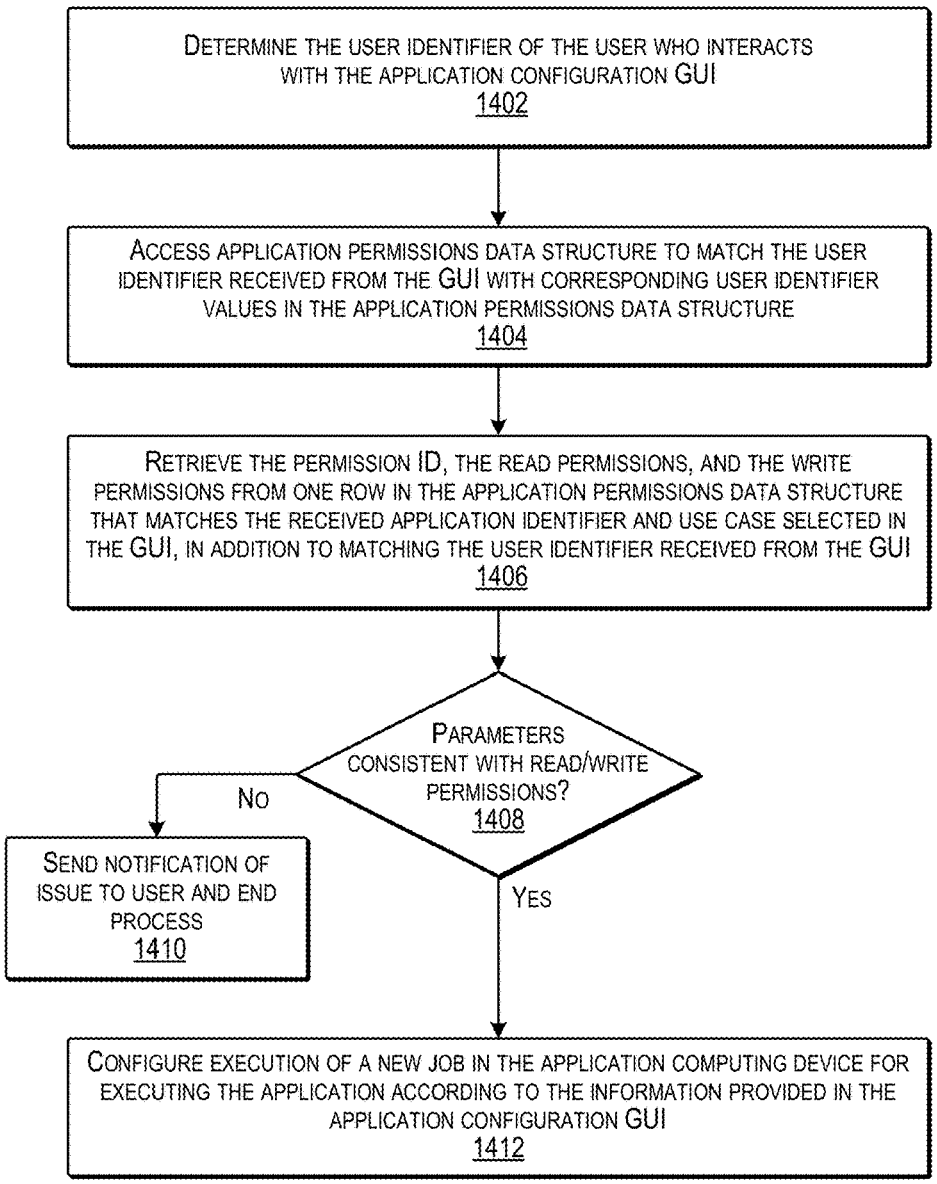
FIG. 14 is a flow diagram illustrating an example process for configuring an application for execution according to some implementations.

FIG. 14 is a flow diagram illustrating an example process 1400 for configuring an application for execution according to some implementations. For example, the management computing device 104, or other suitable computing device, may execute the application configuration program 310 of the management program 140 to perform at least a portion of the process 1400. As one example, the application configuration program 310 may be invoked when a user clicks on the set application for execution button 1116 in the GUI 1100 discussed below with respect to FIG. 11.

At 1402, the computing device may determine the user identifier of the user that is interacting with the application configuration GUI 1100. As one example, the application configuration GUI 1100 may provide information related to the user identifier value used by the user when logged in and interacting with the GUI 1100.

At 1404, the computing device may access the application permissions data structure 318 to match the user identifier value provided by the GUI 1100 with the corresponding entries for the user identifier value 804 in the application permissions data structure 318.

At 1406, the computing device may retrieve the permission ID 802, the read permissions 810, and the write permissions 812 from one row in the application permissions data structure 318 that matches the received application identifier and use case selected in the GUI 1100 in addition to matching the user identifier 804 provided by the GUI 1100.

At 1408, in some examples, the computing device may verify that the parameters 1110 specified by the user in the GUI 1100 are consistent with the read permissions 810 and the write permissions 812 in the single row identified at block 1406. As one example, the verification logic may be specific for each application and use case. If the verification fails the process goes to 1410. On the other hand, if the verification is successful the process proceeds to 1412.

At 1410 if the verification is unsuccessful the computing device may end the process 1400 and may notify the user of the issue. In some examples, the process may further inform the user of a possible solution for solving the issue, which may include a suggestion of alternative parameters.

At 1412, the computing device may configure execution of a new job in the application computing device 102 for executing the application identified by the input and the GUI 1100. For example, the new job may be configured based on information including the permission ID 802 retrieved at 1406, after as well as based on the information at 1106-1114 of FIG. 11 received through the GUI 1100.

From the foregoing, it may be seen that the application configuration program 310 included in the management program 140 may employ a different permission ID for each application and each use case depending on the user that configures the job, which allows more granular data access control, as opposed to the use of the same data access permissions for all applications and for all use cases or when configured by all users. Thus implementations herein avoid the situation in which a first user intentionally or unintentionally configures an application to access data belonging to a different user and to which the first user should not have access.

Figure 15:
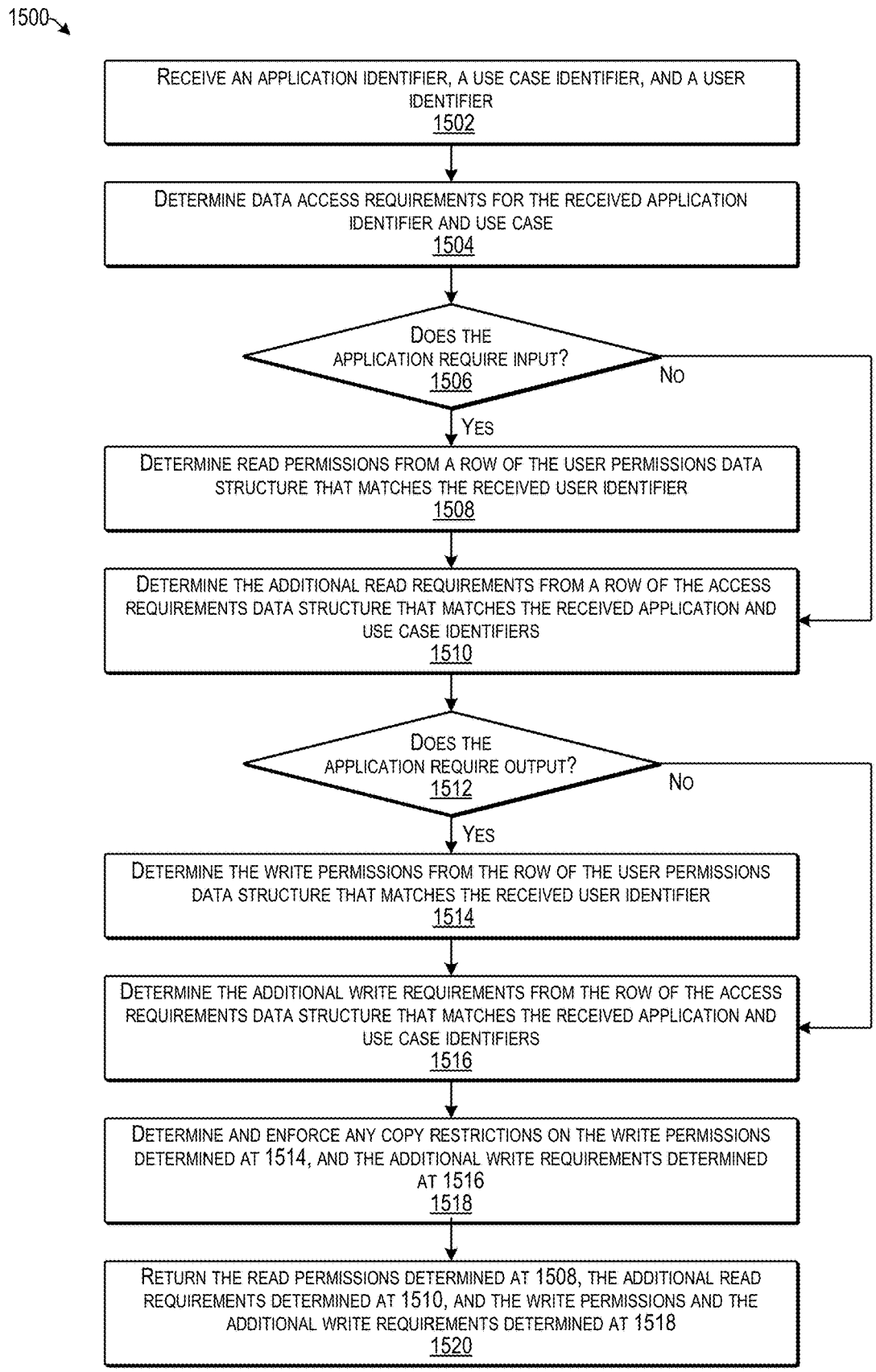
FIG. 15 is a flow diagram illustrating an example process for determining data access permissions for an application according to some implementations.

FIG. 15 is a flow diagram illustrating an example process 1500 for determining data access permissions for an application according to some implementations. The process 1500 of FIG. 15 may be executed in the example system 200 of FIG. 2 discussed above in which data replication is performed for copying data from a first computing site 110(1) to a second computing site 110(2). For example, the management computing device 104, or other suitable computing device, may execute the permissions generation program 309 of the management program 140 to perform at least a portion of the process 1500. For example, the permissions generation program 309 may be invoked by the data access configuration program 308, such as at block 1212 discussed above with respect to FIG. 12.

At 1502, the computing device may receive an application identifier, a use case identifier for the identified application, and a user identifier such as discussed above with respect to block 1212 of FIG. 12. For example, these inputs may be received from the data access configuration program 308, At 1504, the computing device may determine data access requirements for the identified application and use case by accessing the access requirements data structure 314. For example, the computing device may locate a row in the access requirements data structure 314 in which the application 502 and the use case 504 match the received application and use case.

At 1506, the computing device may determine, based on the input requirements 506 of the access requirements data structure 314, whether the application requires an input. If so, the process goes to 1508. If not, the process goes to 1510.

At 1508, the computing device may determine the Read Permissions 406 from a row of the user permissions data structure 312 that matches the user identifier.

At 1510, the computing device may determine the Additional Read Requirements 510 from a row of the access requirements data structure 314 that matches the received application and use case identifiers.

At 1512, the computing device may determine from the row of the access requirements data structure 314 that matches the received application and use case identifiers whether the Output Requirements 508 indicate that an output is required. If so, the process goes to 1514. If not, the process goes to 1516.

At 1514, when output is required, the computing device may determine the Write Permissions 408 from the row of the user permissions data structure 312 that matches the received user identifier.

At 1516, the computing device may determine the Additional Write Requirements 512 from the row of the access requirements data structure 314 that matches the received application and use case identifiers.

At 1518, the computing device may determine and enforce any copy restrictions on the write permissions determined at 1514, and the additional write requirements determined at 1516. For example, the computing device may determine from the access requirements data structure 314 whether remote copying of the output data is permitted. If remote replication of the application's output data is indicated to be prohibited, the computing device may remove from the write permissions determined at 1514 and the write requirements determined at 1516, any folders or other storage locations that are designated to be replicated to another computing site. The computing device may access the data copy data structure 320 to determine the folders and other storage locations that are designated to be replicated to other computing sites.

At 1520, the computing device returns the Read Permissions determined at 1508, the Additional Read Requirements determined at 1510, and the Write Permissions and the Additional Write Requirements determined at 1518. These results are stored in the application permissions data structure 318 as Read Permissions 810 and Write Permissions 812, respectively, and in a row corresponding to the received user identifier, application identifier, and a use case identifier. For example, if the row already exists, the Read Permissions 810 and Write Permissions 812 are updated. If the row does not already exist, a new row may be added to the application permissions data structure 318, and a new PID 802 may be assigned. The generation or updating of the application permissions data structure 318 may be performed by the data access configuration program 308 in some cases, but may alternatively be performed by the permissions generation program 309.

As one concrete example, suppose that the values received by the computing device at block 1502 are application "Repository", use case "Template Generation", and user identifier "UID-HR".

At block 1504, the computing device may determine that the fourth row 516 in the access requirements data structure 314 matches the received application identifier and use case identifier.

At block 1506, the computing device may determine, based on the input requirements 506 of the access requirements data structure 314, that Repository and Template Generation do not require input. Accordingly, the process skips block 1508.

At block 1510, the computing device may determine from the fourth row 516 of the access requirements data structure 314 that the Additional Read Requirements 510 for application "Repository" and use case "Template Generation" is "ishares/repo".

At block 1512, the computing device may determine from the fourth row 516 of the access requirements data structure 314 and the Output Requirements 508 that application "Repository" and use case "Template Generation" require output.

At block 1514, the computing device may determine from the first row 412 of the user permissions data structure 312 that the Write Permissions 408 for UID-SN are "/shares/HR" and "/shares/HR_global".

At block 1516, the computing device may determine from the fourth row 516 of the access requirements data structure 314 that there are no Additional Write Requirements 512 for application "Repository" and use case "Template Generation".

At block 1318, the computing device determines from the access requirements data structure 314 whether remote copying of the output data is permitted, and if not, the computing device accesses the data copy data structure 320 to determine whether the storage locations determined from the Write Permissions and the Additional Write Requirements are configured to be replicated to another computing system site. If remote replication is not permitted, any folders or other storage locations included in the Write Permissions and the Additional Write Requirements that are configured to be replicated to a second computing system site are removed.

At block 1320, the computing device returns "/shares/repo" as Read Permissions 810. Further, the computing device returns "/shares/HR" as Write Permissions 812 ("/shares/HR_global" having been removed from the Write Permissions 812 at block 1318 to prevent replication of the data). These results are stored in the application permissions data structure 318 at the seventh row 816, and corresponding to PID-7, as indicated at 1002 for the write permissions and 818 for the read permissions.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Additionally, while several example systems have been described, numerous other systems able to implement the storage and capacity-usage-balancing techniques herein will be apparent to those of skill in the art having the benefit of the disclosure herein.

Figure 16:
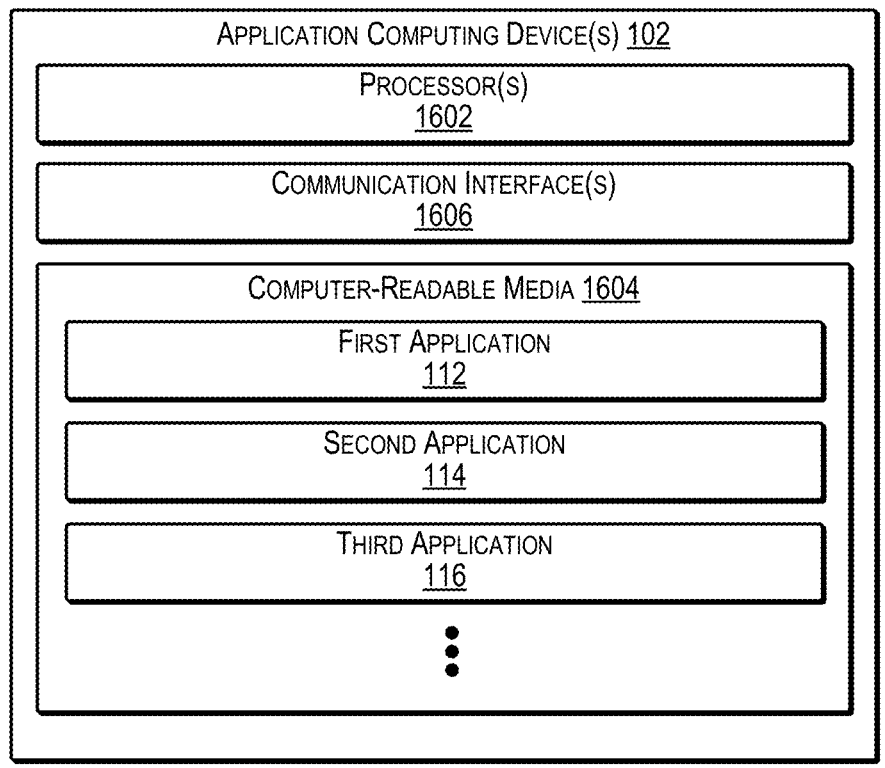
FIG. 16 illustrates an example hardware and logical configuration of the application computing device according to some implementations.

FIG. 16 illustrates an example hardware and logical configuration of the application computing device 102 according to some implementations. In some examples, the application computing device 102 may include one or more servers that may be embodied in any number of ways. For instance, the programs, other functional components, and at least a portion of data storage of the application computing device 102 may be implemented on at least one server, such as in a cluster of servers, a server farm, a data center, a cloud-hosted computing service, and so forth, although other computer architectures may additionally or alternatively be used.

The application computing device 102 may include one or more processors 1602, one or more computer-readable media 1604, and one or more communication interfaces 1606. For example, the processors 1602 may correspond to any of the examples discussed above with respect to the processors 302, the computer-readable media 1604 may correspond to any of the examples discussed above with respect to the computer-readable media 304, and the communication interfaces 1606 may correspond to any of the examples discussed above with respect to the communication interfaces 306.

The computer-readable media 1604 may be used to store any number of functional components that are executable by the processor(s) 1602. In many implementations, these functional components comprise instructions or programs that are executable by the processor(s) 1602 and that, when executed, specifically program the processor(s) 1602 to perform the actions attributed herein to the application computing device 102. Functional components stored in the computer-readable media 1604 may include one or more instances of the first application 112, one or more instances of the second application 114, and one or more instances of the third application 116, which may include one or more computer programs, applications, executable code, or portions thereof. Furthermore, while three example applications 112, 114, 116 are described, the application computing device 102 may include more or fewer applications in other examples.

In addition, the computer-readable media 1604 may store data, data object content, data structures, system data and other information used for executing the application and for performing the functions and services described herein. The application computing device 102 may also include or maintain an operating system and other functional components and data, which may include programs, drivers, etc., and the data used or generated by the functional components. Further, the application computing device 102 may include many other logical, programmatic, and physical components, of which those described above are merely examples that are related to the discussion herein.

Figure 17:
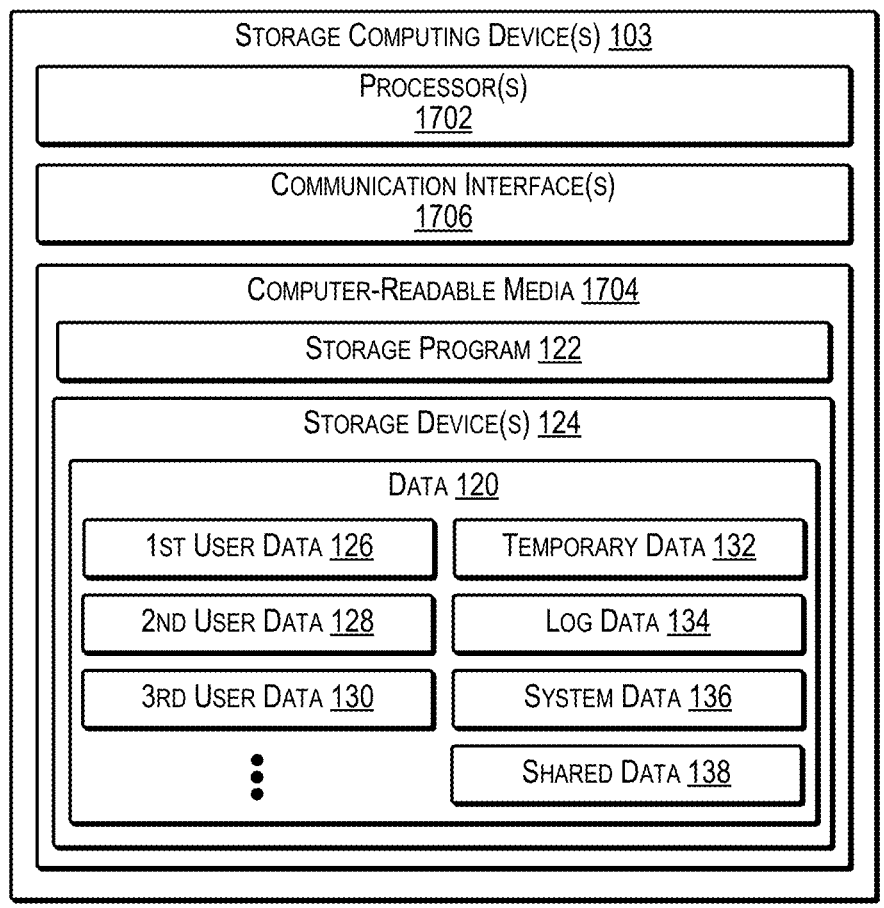
FIG. 17 illustrates an example hardware and logical configuration of a storage computing device according to some implementations.

FIG. 17 illustrates an example hardware and logical configuration of a storage computing device 103 according to some implementations. In some examples, the storage computing device 103 may include one or more servers that may be embodied in any number of ways. For instance, the programs, other functional components, and at least a portion of data storage of the storage computing device 103 may be implemented on at least one server, such as in a cluster of servers, a server farm, a data center, a cloud-hosted computing service, and so forth, although other computer architectures may additionally or alternatively be used. Further, in some examples, the storage computing device(s) 203 may have a hardware and logical configuration similar to that of the storage computing device(s) 103.

The storage computing device 103 may include one or more processors 1702, one or more computer-readable media 1704, and one or more communication interfaces 1706. For example, the processors 1702 may correspond to any of the examples discussed above with respect to the processors 302, the computer-readable media 1704 may correspond to any of the examples discussed above with respect to the computer-readable media 304, and the communication interfaces 1706 may correspond to any of the examples discussed above with respect to the communication interfaces 306.

The computer-readable media 1704 may be used to store any number of functional components that are executable by the processor(s) 1702. In many implementations, these functional components comprise instructions or programs that are executable by the processor(s) 1702 and that, when executed, specifically program the processor(s) 1702 to perform the actions attributed herein to the storage computing device 103. Functional components stored in the computer-readable media 1704 may include the storage program 122, which may include one or more computer programs, applications, executable code, or portions thereof. For example, the storage program may include a server program for responding to requests from the user devices 108 and/or the application computing device(s) 102 and/or the management computing device(s) 104. Further, in some examples, the storage program 122 may include a data copy program for replicating data to a second computing system 110(2). Additionally, the storage program 112 may include a program for managing storage of data, such as for managing storage locations, storage capacity, storage security, storage lifetimes, and so forth.

In addition, the computer-readable media 1704 may store data, data object content, data structures, and other information used for performing the functions and services described herein. For instance, the computer-readable media 1704 may store the data 120, which may include user data 126, 128, 130, . . . , etc., temporary data 132, log data 134, system data 136, shared data 138, and so forth. The storage computing device 103 may also include or maintain other functional components and data, which may include an operating system and other programs, drivers, etc., and the data used or generated by the functional components. Further, the storage computing device 103 may include many other logical, programmatic, and physical components, of which those described above are merely examples that are related to the discussion herein.

Various instructions, processes, and techniques described herein may be considered in the general context of computer-executable instructions, such as programs stored on computer-readable media, and executed by the processor(s) herein. Generally, programs include routines, modules, applications, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
    one or more processors at a first computing site able to communicate with a plurality of user devices associated with a plurality of users,
    the one or more processors providing a plurality of applications executable on the one or more processors at the first computing site based on instructions received from respective user devices of the plurality of user devices associated with the plurality of users,
    the one or more processors configured by executable instructions to perform operations comprising:
        determining data access permissions for each user of the plurality of users;
        determining, for each application of the plurality of applications, data access permissions for the application;
        based on the data access permissions for the plurality of users and the data access permissions for the plurality of applications, generating a data structure including data access permissions for each of the applications, wherein the access permissions for each of the applications are customized for individual users of the plurality of users;
        determining, for a first application of the plurality of applications, that at least some data output by the first application for storage at the first computing site is prohibited by at least one policy associated with the first application from being replicated from the first computing site to a second computing site that stores replicated data received from the first computing site;
        configuring the data access permissions for the first application in the data structure to prevent the at least some data output by the first application from being stored to a folder configured for remote copy to the second computing site;
        receiving, via a user interface, from a user, a user identifier (ID) and an application ID of an application requested by the user to be executed;
        determining, from the data structure, and based on the user ID of the user and the application ID, the data access permissions for executing the application corresponding to the application ID; and
        executing the application corresponding to the application ID based on the data access permissions determined from the data structure and associated with the user ID of the user.

2. The system as recited in claim 1, wherein the data access permissions determined for a respective application of the plurality of applications include read permissions and write permissions.

3. The system as recited in claim 1, wherein at least one application of the plurality of applications includes multiple use cases, the operations further comprising:
    determining, for each respective application and use case combination, data access permissions for the respective application and use case combination; and
    generating the data structure including the data access permissions for each of the application and use case combinations, wherein the data access permissions for each of the application and use case combinations are customized for individual users of the plurality of users.

4. The system as recited in claim 1, wherein:
    the system includes a user permission data structure indicating data access permissions for individual users; and
    the operation of determining the data access permissions for each user of the plurality of users includes accessing the data structure to determine read permissions and write permissions for each user based on the data in the data structure.

5. The system as recited in claim 1, the operations further comprising updating the data structure based on at least one of:
    a change in permission of at least one user to execute at least one of the applications; or a change in access requirements associated with at least one of the applications.

6. A method comprising:
determining, by one or more processors at a first computing site, data access permissions for each user of a plurality of users, wherein the one or more processors are able to communicate with a plurality of user devices associated with the plurality of users, wherein the one or more processors provide a plurality of applications executable on the one or more processors at the first computing site based on instructions received from respective user devices of the plurality of user devices associated with the plurality of users;
determining, by the one or more processors, for each application of the plurality of applications, data access permissions for the application;
based on the data access permissions for the plurality of users and the data access permissions for the plurality of applications, generating, by the one or more processors, a data structure including data access permissions for each of the applications, wherein the access permissions for each of the applications are customized for individual users of the plurality of users;
determining, by the one or more processors, for a first application of the plurality of applications, that at least some data output by the first application for storage at the first computing site is prohibited by at least one policy associated with the first application from being replicated from the first computing site to a second computing site that stores replicated data received from the first computing site; and
configuring, by the one or more processors, the data access permissions for the first application in the data structure to prevent the at least some data output by the first application from being stored to a folder configured for remote copy to the second computing site,
wherein at least one application of the plurality of applications includes multiple use cases, the method further comprising:
determining, for each respective application and use case combination, data access permissions for the respective application and use case combination; and
generating the data structure including the data access permissions for each of the application and use case combinations, wherein the data access permissions for each of the application and use case combinations are customized for individual users of the plurality of users.

7. The method as recited in claim 6, further comprising:
receiving, via a user interface, from a user, a user identifier (ID) and an application ID of an application requested by the user to be executed;
determining, from the data structure, and based on the user ID of the user and the application ID, the data access permissions for executing the application corresponding to the application ID; and
executing the application corresponding to the application ID based on the data access permissions determined from the data structure and associated with the user ID of the user.

8. The method as recited in claim 6, wherein the data access permissions determined for a respective application of the plurality of applications include read permissions and write permissions.

9. The method as recited in claim 6, wherein:
a user permission data structure indicates data access permissions for individual users; and
determining the data access permissions for each user of the plurality of users includes accessing the data structure to determine read permissions and write permissions for each user based on the data in the data structure.

10. The method as recited in claim 6, further comprising updating the data structure based on at least one of:
a change in permission of at least one user to execute at least one of the applications; or
a change in access requirements associated with at least one of the applications.

11. One or more non-transitory computer-readable media storing instructions that are executable by one or more processors at a first computing site to configure the one or more processors to perform operations comprising:
determining, by the one or more processors, data access permissions for each user of a plurality of users, wherein the one or more processors are able to communicate with a plurality of user devices associated with the plurality of users, wherein the one or more processors provide a plurality of applications executable on the one or more processors at the first computing site based on instructions received from respective user devices of the plurality of user devices associated with the plurality of users;
determining, by the one or more processors, for each application of the plurality of applications, data access permissions for the application;
based on the data access permissions for the plurality of users and the data access permissions for the plurality of applications, generating, by the one or more processors, a data structure including data access permissions for each of the applications, wherein the access permissions for each of the applications are customized for individual users of the plurality of users;
determining, for a first application of the plurality of applications, that at least some data output by the first application for storage at the first computing site is prohibited by at least one policy associated with the first application from being replicated from the first computing site to a second computing site that stores replicated data received from the first computing site;
configuring the data access permissions for the first application in the data structure to prevent the at least some data output by the first application from being stored to a folder configured for remote copy to the second computing site;
receiving, via a user interface, from a user, a user identifier (ID) and an application ID of an application requested by the user to be executed;
determining, from the data structure, and based on the user ID of the user and the application ID, the data access permissions for executing the application corresponding to the application ID; and
executing the application corresponding to the application ID based on the data access permissions determined from the data structure and associated with the user ID of the user.

12. The one or more non-transitory computer-readable media as recited in claim 11, wherein the data access permissions determined for a respective application of the plurality of applications include read permissions and write permissions.

13. The one or more non-transitory computer-readable media as recited in claim 11, wherein at least one application of the plurality of applications includes multiple use cases, the operations further comprising:

determining, for each respective application and use case combination, data access permissions for the respective application and use case combination; and generating the data structure including the data access permissions for each of the application and use case combinations, wherein the data access permissions for each of the application and use case combinations are customized for individual users of the plurality of users.

14. The one or more non-transitory computer-readable media as recited in claim 11, the operations further comprising updating the data structure based on at least one of:

a change in permission of at least one user to execute at least one of the applications; or a change in access requirements associated with at least one of the applications.

* * * * *